(12) United States Patent
Kawate et al.

(10) Patent No.: US 8,417,687 B2
(45) Date of Patent: Apr. 9, 2013

(54) FILE PROCESSING APPARATUS, FILE PROCESSING METHOD, PROGRAM AND RECORDING MEDIUM

(75) Inventors: Fumitaka Kawate, Kanagawa (JP); Mitsuhiro Hirabayashi, Tokyo (JP); Hiroshi Jinno, Kanagawa (JP); Masayoshi Ohno, Tokyo (JP); Hideo Obata, Kanagawa (JP); Shigeru Kashiwagi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/666,378

(22) PCT Filed: Aug. 31, 2006

(86) PCT No.: PCT/JP2006/317255
§ 371 (c)(1),
(2), (4) Date: Oct. 1, 2007

(87) PCT Pub. No.: WO2007/026837
PCT Pub. Date: Mar. 8, 2007

(65) Prior Publication Data
US 2008/0177775 A1    Jul. 24, 2008

(30) Foreign Application Priority Data

Aug. 31, 2005  (JP) ............... P2005-252238
Nov. 14, 2005  (JP) ............... P2005-328912

(51) Int. Cl.
*G06F 17/30*  (2006.01)
(52) U.S. Cl.
USPC ........... 707/711; 707/737; 707/741; 707/753; 707/823; 707/830
(58) Field of Classification Search ............. 707/706, 707/711, 737, 741, 753, 830, 823
See application file for complete search history.

(56) References Cited

U.S. PATENT DOCUMENTS 5,682,497 A    10/1997  Robinson
5,806,072 A    9/1998   Kuba et al.
(Continued)

FOREIGN PATENT DOCUMENTS

JP    06-044318 A     2/1994
JP    2000-083221 A   3/2000
(Continued)

OTHER PUBLICATIONS

Supplementary European Search Report, EP 06 79 7215, Dec. 4, 2007.

(Continued)

*Primary Examiner* — Thanh-Ha Dang
(74) *Attorney, Agent, or Firm* — Lerner, David, Littenberg, Krumholz & Mentlik, LLP

(57) ABSTRACT

Update processing and the like of an index file relating to change of a hierarchical structure is performed. The index file is recorded in a recording medium with content files. The index file is generated based on attribute information of content files and folders including the content files. Content files and folders form a hierarchical structure in which the folders are in an upper hierarchy. In the index file, a prescribed number of entries (management information areas) corresponding to content files and folders, respectively, are provided. Second index information indicating second entries corresponding to folders or content files positioned in a lower hierarchy of folders in the upper hierarchy is provided at first entries corresponding to folders in the upper hierarchy in a list format. First index information indicating the first entries is provided at the second entries.

20 Claims, 31 Drawing Sheets

U.S. PATENT DOCUMENTS

| | | | |
|---|---|---|---|
| 6,278,678 B1 * | 8/2001 | Iida | 369/83 |
| 6,370,543 B2 * | 4/2002 | Hoffert et al. | 725/113 |
| 6,380,947 B1 | 4/2002 | Stead | |
| 6,404,676 B2 * | 6/2002 | Kihara et al. | 365/185.12 |
| 6,427,123 B1 | 7/2002 | Sedlar | |
| 6,804,745 B2 * | 10/2004 | Seto | 711/111 |
| 6,856,997 B2 * | 2/2005 | Lee et al. | 1/1 |
| 7,287,038 B2 * | 10/2007 | Murakami et al. | 1/1 |
| 7,460,443 B2 * | 12/2008 | Elmers et al. | 369/30.06 |
| 7,610,262 B2 * | 10/2009 | Yoshida et al. | 1/1 |
| 8,082,257 B2 * | 12/2011 | Takahashi | 707/741 |
| 2001/0011267 A1 * | 8/2001 | Kihara et al. | 707/1 |
| 2003/0041304 A1 * | 2/2003 | Numata et al. | 715/513 |
| 2003/0115227 A1 | 6/2003 | Guthery | |
| 2003/0182297 A1 * | 9/2003 | Murakami et al. | 707/100 |
| 2004/0172416 A1 * | 9/2004 | Murakami et al. | 707/104.1 |
| 2004/0184775 A1 | 9/2004 | Nakamura et al. | |
| 2004/0267698 A1 * | 12/2004 | Shinkai et al. | 707/1 |
| 2005/0192982 A1 * | 9/2005 | Takahashi | 707/100 |
| 2005/0198071 A1 * | 9/2005 | Yoo et al. | 707/104.1 |
| 2005/0256864 A1 * | 11/2005 | Semerdzhiev | 707/5 |
| 2006/0067171 A1 * | 3/2006 | Elmers et al. | 369/30.3 |
| 2006/0235880 A1 * | 10/2006 | Qian | 707/104.1 |
| 2007/0110047 A1 * | 5/2007 | Kim | 370/389 |
| 2007/0214405 A1 * | 9/2007 | Chang et al. | 715/500.1 |
| 2007/0234196 A1 * | 10/2007 | Nicol et al. | 715/501.1 |

FOREIGN PATENT DOCUMENTS

| | | |
|---|---|---|
| JP | 2002-341895 A | 11/2002 |
| JP | 2003-022656 A | 1/2003 |
| JP | 2003-140944 A | 5/2003 |
| JP | 2004-110609 | 4/2004 |
| JP | 2004-227630 A | 8/2004 |
| JP | 2004-227633 A | 8/2004 |
| JP | 2004-259392 A | 9/2004 |
| JP | 2005-032315 A | 2/2005 |
| JP | 2005-108135 A | 4/2005 |
| JP | 2005-115815 A | 4/2005 |
| WO | 2005004154 | 1/2005 |

OTHER PUBLICATIONS

Summons to attend oral proceedings pursuant to Rule 115 (1) EPC, from EP Application No. 06797215.8, dated Jul. 10, 2012.

Cidon, I. et al.: Optimal allocation of electronic content; Twentieth AnnualJoint Conference of the IEEE Computer and Communications Societies,vol. 3,Apr. 22-26, 2001; pp. 1773-1780.

Search Report from corresponding Singapore applicaton 200703047, Jan. 17, 2008.

* cited by examiner

FIG. 5

Property Data

| Length | |
|---|---|
| 4 | Property Data Area Size |
| 4 | Property Data Size |
| M | Basic Property Data |
| N | Property Extension Data Unit |

FIG. 6

| Length [byte] | |
|---|---|
| 4 | size |
| 2 | entry_status_flags |
| 2 | folder_entry_status_flags |
| 4 | parent_entry_index |
| 4 | previous_entry_index |
| 4 | next_entry_index |
| 8 | recording_order |
| 2 | property_extension_data_unit_count |
| 4 | entry_creation_time |
| 4 | entry_modification_time |
| 4 | original_folder_status_flags |
| 4 | directory_creation_time |
| 4 | directory_modification_time |
| N | Directory_Identifier |

FIG. 7

| Length [byte] | |
|---|---|
| 4 | size |
| 2 | data_type (= Child Entry List) |
| 1 | type_of_entry |
| 1 | type_of_sort |
| 4×N | entry_index |

FIG. 21

| Length [byte] | |
|---|---|
| 4 | size |
| 2 | data_type (= Original Folder Time) |
| 1 | type_of_entry |
| 1 | type_of_sort |
| 4 | time |

FIG. 33

| Length [byte] | |
|---|---|
| 4 | size |
| 2 | data_type (= Default Time Zone Offset) |
| 2 | time_zone_offset |

FIG. 34

| Length [byte] | |
|---|---|
| 4 | size |
| 2 | data_type (= Time Zone Offset) |
| 2 | time_zone_offset |

FILE PROCESSING APPARATUS, FILE PROCESSING METHOD, PROGRAM AND RECORDING MEDIUM

CROSS-REFERENCE TO RELATED APPLICATIONS

The present application is a national stage application under 35 U.S.C. §371 of International Application No. PCT/JP2006/317255, filed Aug. 31, 2006, which claims priority from Japanese Application Nos. P2005-252238, filed Aug. 31, 2005, and P2005-328912, filed Nov. 14, 2005, the disclosures of which are incorporated herein by reference.

BACKGROUND OF THE INVENTION

1. Technical Field

The present invention relates to a file processing apparatus, a file processing method, a program and a recording medium recording an index file which manages contents files in a recording medium, or playing the index file from the recording medium. More particularly, the invention relates to the file processing apparatus and the like capable of easily and rapidly executing processing such as relating to change of a hierarchical structure managed by the index file, by providing index information indicating entries (management information areas) in a lower hierarchy at corresponding entries in an upper hierarchy in a list form.

2. Background Art

Conventionally, as a method of finding a desired file easily from a lot of files recorded in a large capacity recording medium, a method of using an index file is proposed in Patent Document 1, Patent Document 2, Patent Document 3 and so on.

The index file manages respective content files, formed or generated from a cluster of attribute information of respective contents files. As attribute information of content files, for example, there are thumbnail image data, text data of titles, imaging date and time, codec information, face detection information (detected face size, detected face position and detected face score in which detected face is digitalized) and the like. However, attribute information is not limited to the above. The attribute information of respective content files includes management information of respective content files.

The index file includes, for example, a text file (or metadata file) FTX, a thumbnail image file FTH and a property file FP as shown in FIG. 35. The attribute information of each content file is arranged separately in the text file FTX, the thumbnail image file FTH, and the property file FP.

According to the type of the content file, there is a case that there is no attribute information to be arranged in the text file FTX and the thumbnail image file FTH, and no entry can be provided. In FIG. 35, a case that there is attribute information to be arranged in the text file FTX, the thumbnail image file FTH and the property file FP respectively as attribute information of respective content files.

In this case, the text file FTX manages text information (metadata in the case of metadata file). The thumbnail image file FTH manages image data of thumbnail. The property file FP manages attribute information (basic attribute information) other than attribute information concerning the text file FTX and the thumbnail image file FTH, and also manages connection information between slots of other files.

In the property file FP, a header showing an attribute and the like is arranged at the head. Whereas in the text file FTX and the thumbnail image file FTH, a header is not arranged at the head thereof. However, there is a case that a header showing an attribute and the like is arranged at the head also in the text file FTX and the thumbnail image file FTH. Following the header, entries including attribute information of respective content files (a property entry #1, a property entry #2, . . . , a thumbnail entry #1, a thumbnail entry #2, a text entry #1, a text entry #2, . . . ,) are continuously arranged.

In each entry of the text file FTX, data indicating character strings of a disk title and a title concerning each content file and the like is allocated. In each entry of the thumbnail image file FTH, thumbnail image data indicating a disk title and the contents of each content file is allocated.

Each entry in the text file FTX and in the thumbnail image file FTH includes fixed-length slots respectively. The number of slots included in each entry is one or plural slots according to the amount of data of attribute information allocated to each entry. The types of attribute information are different according to the type of content data, therefore, there is a case that no entry is provided as described above.

In each entry of the property file FP, data indicating a disk title and an attribute of each content file is allocated. The property file FP includes fixed-length slots in the same way as the text file FTX and the thumbnail image file FTH. In the property file FP, even when the types of content files are variously different, the entry is always provided corresponding to each content file.

In each entry of the property file FP, management information which specifies corresponding entries in the text file FTX and the thumbnail image file FTH is set as the management information indicating the relation with respect to the other entries (relation information shown by arrows in FIG. 35). In the entry of the property file FP including plural slots, management information which specifies next slot is set in respective slots. Also in each entry of the property file FP, information specifying a corresponding content file is set.

The index file is configured as described above. Accordingly, for example, titles of respective content files recorded in a recording medium 2 can be displayed in a list by playing data strings recorded in the text file FTX. Also, for example, thumbnail images of respective content files recorded in the recording medium 2 can be displayed in a list by playing data strings recorded in the thumbnail image file FTX.

It should be noted that the index file IF can define not only such existing content files but also existing folders or virtual folders by the files FTX, FTH, and FP. In each entry of the property file FP, management information indicating an entry of a folder in an upper hierarchy to which a corresponding content file or folder belongs is set. The index file is generated so as to improve user usability by managing content files by the hierarchical structure by the existing folder or the virtual folder.

FIG. 36 shows an example of correspondence between the property file and, content files and virtual folders. In the example, a virtual file in which an imaging date is "x-day of y-month" and a virtual file in which an imaging date is "z-day of y-month" exist on the same hierarchy, and a content file "MPEG2PS-1" exists in a lower hierarchy of the virtual file of "x-day of y-month", and content files "MPEG2PS-2" and "MPEG2PS-3" exist in the lower hierarchy of the virtual file of "z-day of y-month".

In the property file, as shown in FIG. 36, a file entry #1, a folder entry #4, a file entry #6, a folder entry #8 and a folder entry #9 are formed corresponding to the above hierarchical structure. A number of each entry is a number of a head slot in slots forming the entry. In the example in the drawing, a number of each entry is the minimum number of the slots which forms the entry for convenience.

The file entries #1, #6, and #9 respectively manage content files "MPEG2PS-1", "MPEG2PS-2" and "MPEG2PS-3", and folder entries #4 and #8 respectively manage virtual folders of "x-day of y-month" and "z-day of y-month".

[Patent Document 1] JP-A-2004-227630
[Patent Document 2] JP-A-2004-227633
[Patent Document 3] JP-A-2005-115815

SUMMARY OF THE INVENTION

As described above, when content files are set to be managed by the hierarchical structure by existing folders or virtual folders, there is a case that a folder concerning to an upper hierarchy is deleted. Specifically, when taken and acquired content files are managed by the hierarchical structure by virtual folders such as an image taking date, or an image taking place, there is a case that the user deletes the virtual folder.

In this case, it is necessary to delete a corresponding entry also on the index file according to the deletion of the folder. It is also necessary to delete an entry together, which is in the lower hierarchy of the entry to be deleted, or to rearrange the entry in the lower hierarchy of the entry to be deleted to just under an entry in an upper hierarchy of the entry to be deleted according to the deletion of the folder.

As in the conventional index file, in the case that the hierarchical structure of existing folders and virtual folders is defined by management information indicating entries in the upper hierarchy from entries in the lower hierarchy, it is necessary to detect an entry which requires to be processed by searching all entries and to update management information set in the detected entry.

In this case, when only approximately several hundred content files are recorded in a recording medium, it is possible to detect necessary entries and update management information sufficiently rapidly in actual use. However, when several thousand content files are recorded in a recording medium and management target by the index file becomes enormous, it becomes difficult to ignore time required for searching and updating entries. In this case, there is a problem that user usability decreases.

When content files to be managed by the index file are a few in number, it becomes difficult to ignore time required for the search and update of such entries, therefore, there is a problem that user usability decreases.

The increase of time required for processing occurs not only in the case of deleting the folder as described above but also in the case of variously changing the hierarchical structure, which deteriorates user usability.

An object of the invention is to execute processing and the like relating to change of the hierarchical structure managed by the index file easily and rapidly.

The concept of the invention is in a file processing apparatus recording an index file in a recording medium, which manages one or more content files recorded in the recording medium, which is characterized by including an index file generation unit generating the index file based on attribute information of the content files and folders including the content files; and a recording unit recording the index file generated in the index file generation unit in the recording medium, and the content files and the folders form a hierarchy structure in which the folders are in an upper hierarchy, the index generation unit provides the prescribed number of management information areas corresponding to the content files and the folders respectively in the index file, second index information indicating second management information areas corresponding to the folders or the content files positioned in a lower hierarchy of the folders in the upper hierarchy in a list format at first management information areas corresponding to the folders in the upper hierarchy, and first index information indicating the first management information areas at the second management information areas.

The concept of the invention is in a file processing apparatus which plays an index file from a recording medium, which manages one or more content files recorded in the recording medium, which is characterized by including an index file playing unit playing the index file from the recording medium, and the prescribed number of management information areas corresponding to the content files and folders including the content files respectively are provided in the index file, the content files and the folders form a hierarchy structure in which the folders are in an upper hierarchy, second index information indicating second management information areas corresponding to the folders or the content files positioned in a lower hierarchy of the folders in the upper hierarchy is provided in a list format at first management information areas corresponding to the folders in the upper hierarchy, as well as first index information indicating the first management information areas is provided at the second management information areas, and the index file playing unit plays the second management information areas based on the second index information set at the first management information areas and the first management information areas based on the first index information set at the second management information areas.

In the invention, the index file is recorded in the recording medium with content files. The index file is generated in the index file generation unit based on attribute information of content files and folders including the content files. In this case, the hierarchical structure is formed by content files and the folders in which folders are in the upper hierarchy. The index file thus generated is recorded in the recording medium by the recording unit as well as played from the recording medium by the playing unit.

In the index file generated in the index file generation unit, the prescribed number of entries (management information areas) corresponding to contents files and folders respectively are provided. In first entries corresponding to folders in the upper hierarchy, second index information indicating second entries corresponding to folders or content files positioned in the lower hierarchy of the folders in the upper hierarchy is provided in a list form. In addition, first index information indicating the first entries is provided in the second entries.

According to second index information provided in first entries and first index information provided in second entries, it is possible to follow the hierarchical structure, namely, from the upper hierarchy to the lower hierarchy or, inversely, from the lower hierarchy to the upper hierarchy. As a result, a desired entry can be detected without searching all entries, thereby performing processing relating to the change and the like of the hierarchical structure managed by the index file easily and rapidly. The second index information is provided in the first entry in a list. Therefore, various processing can be simplified by devisal such as the sorting order of the list.

Additionally, in the index file playing unit, second entries are played based on the second index information set in the first entries and first entries are played based on the first index information set in the second entries. As a result, the processing of playing the index file can be performed easily and rapidly.

According to the invention, index information indicating entries (management information areas) in the lower hierarchy are provided in corresponding entries in the upper hierarchy in the list format, thereby performing processing and the like relating to change of the hierarchical structure managed by the index file easily and rapidly.

BRIEF DESCRIPTION OF THE DRAWINGS

FIG. 5 is a table showing a configuration of a property data.

FIG. 6 is a table showing a configuration of basic data relating to a folder entry in the property entry file.

FIG. 7 is a table showing management information of a child entry.

FIG. 21 is a chart showing a configuration of an extension data unit according to representative time information.

FIG. 33 is a table showing a configuration of standard management information.

FIG. 34 is a table showing a configuration of individual management information.

DETAILED DESCRIPTION

Figure 1:
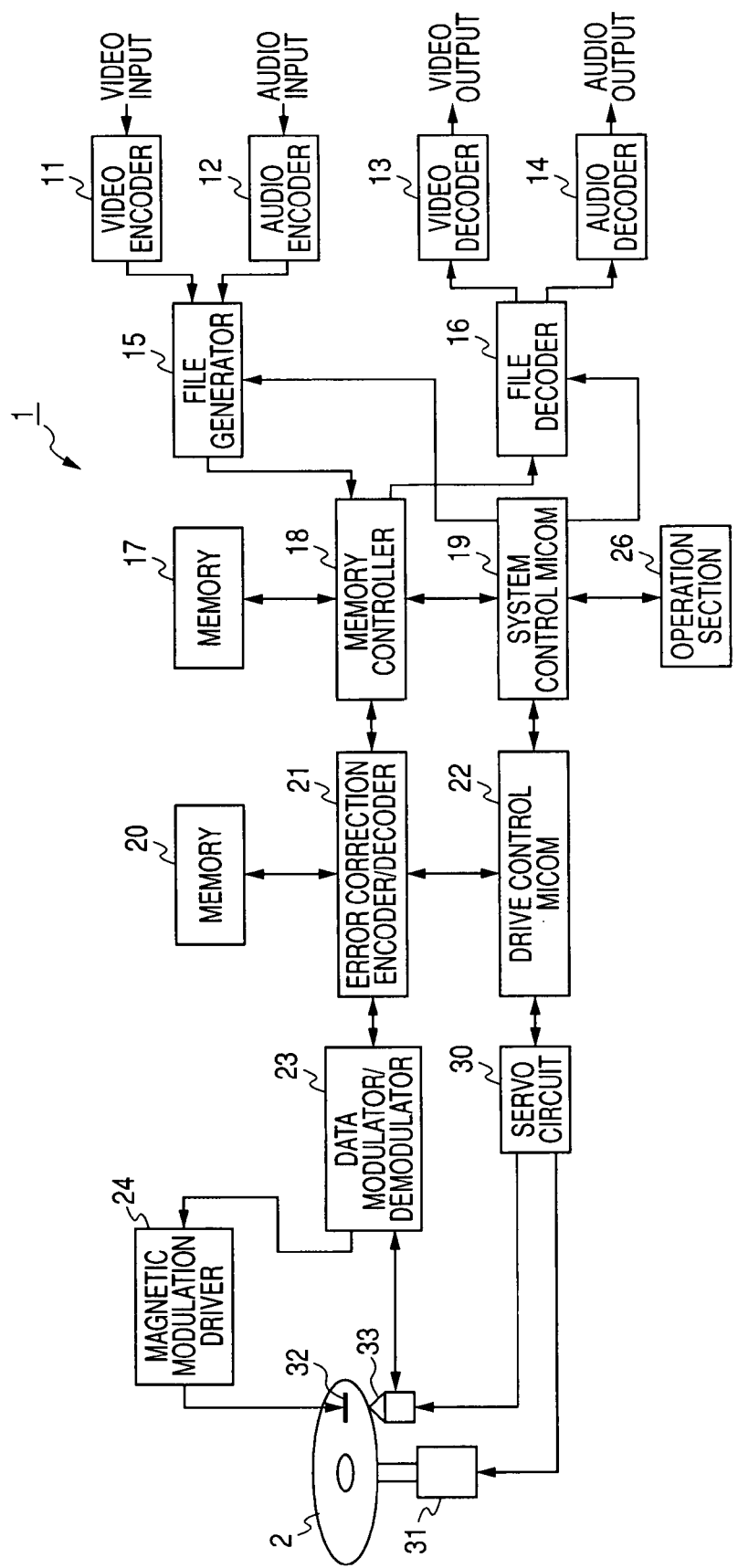
FIG. 1 is a block diagram showing a configuration of an optical disk apparatus.

Description of the Reference Numerals and Signs

1: optical disk apparatus, 2: optical disk, 11: video encoder, 12: audio encoder, 13: video decoder, 14: audio decoder, 15: file generator, 16: file decoder, 17, 20: memory, 18: memory controller, 19: system control micom, 21: error correction encoder/decoder, 22: drive control micom, 23: data modulator/demodulator, 24: magnetic modulation driver, 26: operation unit

BEST MODE FOR CARRYING THE INVENTION (1) Optical Disk Apparatus

FIG. 1 shows a configuration of an optical disk apparatus 1 according to an embodiment.

The optical disk apparatus 1 acquires a video signal and an audio signal of a subject by an imaging means and an audio acquisition means which are not shown, and records the imaging result by the video signal and audio signal in an optical disk 2 as a content file. The optical disk apparatus 1 also plays the content file recorded in the optical disk 2 to be outputted using a display means by a liquid crystal display panel and an audio output means by a speaker, or to be outputted to external equipment. And further, the optical disk apparatus 1 encodes the video signal and the audio signal by a format of MEPG (Moving Picture Experts Group), then, records in the optical disk 2 in a designated file format.

The optical disk apparatus 1 includes an optical disk 2, a video encoder 11, an audio encoder 12, a video decoder 13, an audio decoder 14, a file generator 15, a file decoder 16, a memory 17, a memory controller 18, a system control microcomputer (hereinafter, referred to as a "system control micom") 19, a memory 20, an error correction encoder/decoder 21, a drive control microcomputer (hereinafter, referred to as a "drive control micom") 22, a data modulator/demodulator 23, a magnetic modulation driver 24, an operation unit 26, a servo circuit 30, a spindle motor 31, a magnetic-field head 32, an optical pickup 33. The optical disk 2 forms a recording medium.

The video encoder 11 generates video data by performing analog/digital conversion on the video signal as the imaging result and encodes the video data according to the MPEG format to output an elementary stream by video data. The audio encoder 12 generates audio data by performing analog/digital conversion on the audio signal as the imaging result and encodes the audio data according to the MPEG format to output an elementary stream by audio data.

The file generator 15 multiplexes the elementary streams outputted from the video encoder 11 and the audio encoder 12 at the time of recording and generates a content file in a designated file format by control of the system control micom 19.

The memory controller 18 switches operation at the time of recording and playing by the control of the system control micom 19. The memory controller 18, at the time of recording, sequentially records data strings of the content file outputted from the file generator 15 and various data outputted from the system control micom 19 in the memory 17 and stores them temporarily, then, outputs the stored data according to sequential processing of the error correction encoder/decoder 21. The memory controller 18, at the time of playing, sequentially records output data of the error correction encoder/decoder 21 in the memory 17 and stores it temporarily, outputs data strings of content file to the file decoder 16 and outputs various data to the system control micom 19.

The error correction encoder/decoder 21 switches operation at the time of recording and playing by control of the system control micom 19. The error correction encoder/decoder 21, at the time of recording, records output data of the memory controller 18 temporarily in the memory 20 and adds an error correction code. The error correction encoder/decoder 21, at the time of recording, reads out the data stored in the memory 20 as the above in a prescribed order and outputs the interleaved data to the data modulator/demodulator 23.

The error correction encoder/decoder 21, at the time of playing, records data outputted from data modulator/demodulator 23 temporarily in the memory 20 to perform interleave processing as well as to perform error correction processing by the error correction coded added at the time of recording. The error correction encoder/decoder 21, at the time of playing, also outputs the data stored in the memory 20 as the above in the same order as recorded and output it to the memory controller 18.

The data modulator/demodulator 23 switches operation at the time of recording and playing by control of the system control micom 19. The data modulator/demodulator 23, at the time of recording, converts output data of the error correction encoder/decoder 21 into serial data strings, then, modulates them to be outputted to the magnetic modulation driver 24 or the optical pickup 33. The data modulator/demodulator 23, at the time of playing, obtains playback data corresponding to the serial data strings generated at the time of recording by playing a clock from a playback signal outputted from the optical pickup 33 and demodulating the playback signal using binary identification, taking the clock as a reference, and outputs the playback data to the error correction encoder/decoder 21.

When the optical disk 2 is an optical magneto-optical disk, the magnetic modulation driver 24 drives the magnetic-field head 32 according to an output signal of the data modulator/demodulator 23 by control of the system control micom 19 at the time of recording. The magnetic-field head 32 is held so as to face the optical pickup 33, sandwiching the optical disk 2 in between, applying modulated magnetic field according to the output data of the data modulator/demodulator 23 at a position of a laser beam irradiation by the optical pickup 33. Therefore, when the optical disk 2 is the magneto-optical disk, the optical disk apparatus 1 records a content file and the like by a magneto thermal recording method.

The optical disk 2 is an optical disk which is rewritable such as a magneto-optical disk (MO: Magneto Optical disk) and a phase-change disk. The spindle motor 31 rotationally drives the optical disk 2 by control of the servo circuit 30 in a condition such as a CLV (Constant linear Velocity), a CAV (Constant Angle Velocity) or a zone CLV (Zone Constant linear Velocity), depending on the type of the optical disk 2.

The servo circuit 30 controls operation of the spindle motor 31 based on various signals outputted from the optical pickup 33. The servo circuit 30 also performs tracking control and focus control of the optical pickup 33, performs seek control of the optical pickup 33 and the magneto-optical head 32, and further, executes processing such as a focus search based on various signals outputted from the optical pickup 33.

The drive control micom 22 controls these operations of seeking and the like in the servo circuit 30 according to instructions from the system control micom 19.

The optical pickup 33 irradiates a laser beam onto the optical disk 2 and receives the returning light by a light receiving element, and generates and outputs various signals for control by calculating the result of receiving light by the light receiving element, then, outputs a playback signal whose signal level varies according to pit strings and mark strings formed on the optical disk 2.

The optical pickup 33 switches operation by control of the system control micom 19, and when the optical disk 2 is a magneto-optical disk, allows the amount of light of the laser beam irradiated on the optical disk 2 to rise intermittently at the time of recording. In this case, the optical disk apparatus 1 records a content file and the like in the optical disk 2 by a so-called pulse train method. When the optical disk 2 is a phase-change disk, the optical pickup 33 also allows the amount of light of the laser beam irradiated on the optical disk 2 to rise from the amount of light at the time of playback to the amount of light at the time of writing according to output data of the data modulator/demodulator 23. In this case, the optical disk apparatus 1 records a content file and the like in the optical disk 2 by applying a thermal recording method.

The file decoder 16 inputs data of the content file outputted from the memory controller 18 and separates the data into elementary streams of video data and audio data to be outputted. The video decoder 13 extends the elementary stream of video data outputted from the file decoder 16 and outputs it to a not-shown display means or external equipment. The audio decoder 14 extends the elementary stream of audio data outputted from the file decoder 16 and outputs it to a not-shown audio output means or external equipment.

The operation unit 26 includes various operation elements, a touch panel disposed at the liquid crystal display panel and the like of the optical disk apparatus 1, and which notify various operations by the user to the system control micom 19.

The system control micom 19 is a microcomputer controlling the whole operation of the optical disk apparatus 1, which controls the whole operation by execution of a designated processing program recorded in a not-shown memory. In the embodiment, the processing program concerning the system control micom 19 is provided by previously installed in the optical disk apparatus 1. However, it is also preferable that the processing program is provided, instead of the previous installation, by being downloaded through networks such as Internet, or by being recorded in various recording media such as the optical disk, the magnetic disk or a memory card.

According to the execution of the processing program, the system control micom 19 allows the optical pickup 33 to seek to the most inner circumference of the optical disk 2 and plays management information of a file management system relating to the optical disk 2 when, for example, the mounting of the optical disk 2 is detected. The system control micom 19 acquires the played management information from the memory controller 18 and stores it in an internal memory.

The system control micom 19 detects addresses of respective files recorded in the optical disk 2 and available space by storing management information in the internal memory as described above. The system control micom 19 also plays the index file recorded in the optical disk 2 according to the search result of the management information, providing various content files recorded in the optical disk 2 to the user to receive operations by the user. The index file played from the optical disk 2 is stored in the internal memory of the system control micom 1 or the memory 17. In the embodiment, the index file is stored in the internal memory.

When recording of an imaging result is instructed by the user, the system control micom 19 detects the available space according to management information stored in the internal memory, allowing the optical pickup 33 to seek to the available space and records a content file as the imaging result in the optical disk 2.

The system control micom 19 also updates management information stored in the internal memory so as to correspond to the record of the content file, and for example, at the time of ejecting the optical disk 2, the management information recorded in the optical disk 2 is updated according to the updated management information. In the update of the management information, the system control micom 19 executes the update by outputting the updated management information stored in the internal memory to the error correction encoder/decoder 21 through the memory controller 18.

Furthermore, when an edit of the content file is instructed by the user operation and recording of another content file as the edited result is instructed, the system control micom 19 records another content file in the optical disk 2.

The system control micom 19, when recording the content file in the optical disk 2 as described above, outputs various information necessary for generating the content file to the file generator 15. The system control micom 19 also acquires information necessary for generating the index file through the video encoder 11, the audio encoder 12 and the file generator 15. Then, the system control micom 19 updates the index file stored in the internal memory so as to correspond to the record of the content file in the optical disk 2 according to the acquired information and the information outputted to the file generator 15, and updates the index file recorded in the optical disk 2 by the updated index file data.

In this case, the system control micom 19 updates the index file so as to correspond to the record of the content file stored in the internal memory by additionally registering an entry in the index file, which corresponds to the content file recorded in the optical disk 2.

Operation of the optical disk apparatus 1 shown in FIG. 1 will be briefly explained.

When the optical disk 2 is mounted after the main unit of equipment is turned on, or when the power is turned on in a state that the optical disk 2 is mounted, the optical pickup 33 is controlled so as to seek to the most inner circumference of the optical disk 2, and management information of the file management system is played from the optical disk 2. The management information is stored in the internal memory in the system control micom 19 through the memory controller 18. In the system control micom 19, addresses of respective files recorded in the optical disk 2 and available space and the like are detected according to the management information stored in the internal memory. After the management information is thus acquired, the index file is played from the optical disk 2 based on the search result of the management information. The index file is stored in the internal memory of the system control micom 19.

Operation when a content file in which images are taken by an imaging means is recorded in the optical disk 2 will be explained.

Video data and audio data which have been acquired by the imaging means and the audio acquisition means are encoded at the video encoder 11 and the audio encoder 12 respectively, then, supplied to the file generator 15. In the file generator 15, elementary streams of video and audio obtained at the video encoder 11 and the audio encoder 12 are multiplexed and a content file of a designated file format is generated.

The content file is recorded in designated available space of the optical disk 2 through a recording system including the memory controller 18, the error correction encoder/decoder 21, data modulator/demodulator 23, a magnetic modulation driver 24, and the optical pick up 33.

In parallel to the recording processing of the content file, thumbnail image data is generated from video data. According to the thumbnail image data, a file name of the content file and the like which are attribute information of the content file to be recorded, data of the index file stored in the internal memory is updated by the system control micom 19.

As described above, after the content file is recorded in the optical disk 2, the index file recorded in the optical disk 2 is updated based on data of the index file held in the internal memory of the system control micom 19, which has been updated so as to correspond to the record of the content file.

After the management information stored in the internal memory of the system control micom 19 is updated and the index file is updated so as to correspond to the record of the content file, or for example, when the optical disk 2 is ejected, the management information recorded in the optical disk 2 is updated based on the updated management information.

Next, operation at the time of playback, in which a designated content file is played with reference to the list display of content files recorded in the optical disk 2 will be explained.

When the list display of content files is instructed by the user, thumbnail image data corresponding to respective content files are sequentially acquired from data of the index file stored in the internal memory of the system control micom 19, and thumbnail image data relating to the list display is supplied to a not-shown display means from the system control micom 19 through the file decoder 16 and the video decoder 13, as a result, thumbnail images relating to respective content files recorded in the optical disk 2 are displayed in a list on the display means.

Accordingly, in a state that thumbnail images are displayed in a list on the display means, a designated thumbnail image is selected and playback thereof is instructed by user operation, the content file corresponding to the selected designated thumbnail image is played from the optical disk 2 by control of the system control micom 19 based on data of the index file and management information of the management system stored in the internal memory. In this case, the content file played from the optical disk 2 is obtained through the optical pickup 33, the data modulator/demodulator 23, the error correction encoder/decoder 21, an the memory controller 18. Then, after the played content file is separated into elementary streams of video data and audio data at the file decoder 16, the respective elementary streams are decoded by the video decoder 13 and the audio decoder 14 to be outputted.

Next, operation at the time of editing will be explained, in which delete, movement and the like of the designated content file, or setting, movement, delete and the like of a folder are performed.

As described above, for example, when setting, movement, delete and the like of the file or the folder is instructed by the user operation in a state that thumbnail images (content files, virtual files are displayed in the hierarchical structure) are displayed in a list on the display means, processing of setting, movement, delete and the like of the file or the folder is performed by control of the system control micom 19 based on data of the index file and management information of the management system stored in the internal memory.

In parallel to the processing of setting, movement, delete and the like of the file or the folder, data of the index file stored in the internal memory is updated by the system control micom 19. Then, after the processing of the above setting, movement, delete and the like of the folder is finished by control of the system control micom 19, the index file recorded in the optical disk 2 is updated based on data of the updated index file in the internal memory. In addition, update of management information recorded in the optical disk 2 is performed by control of the system control micom 19.

(2) Index File

Figure 35:
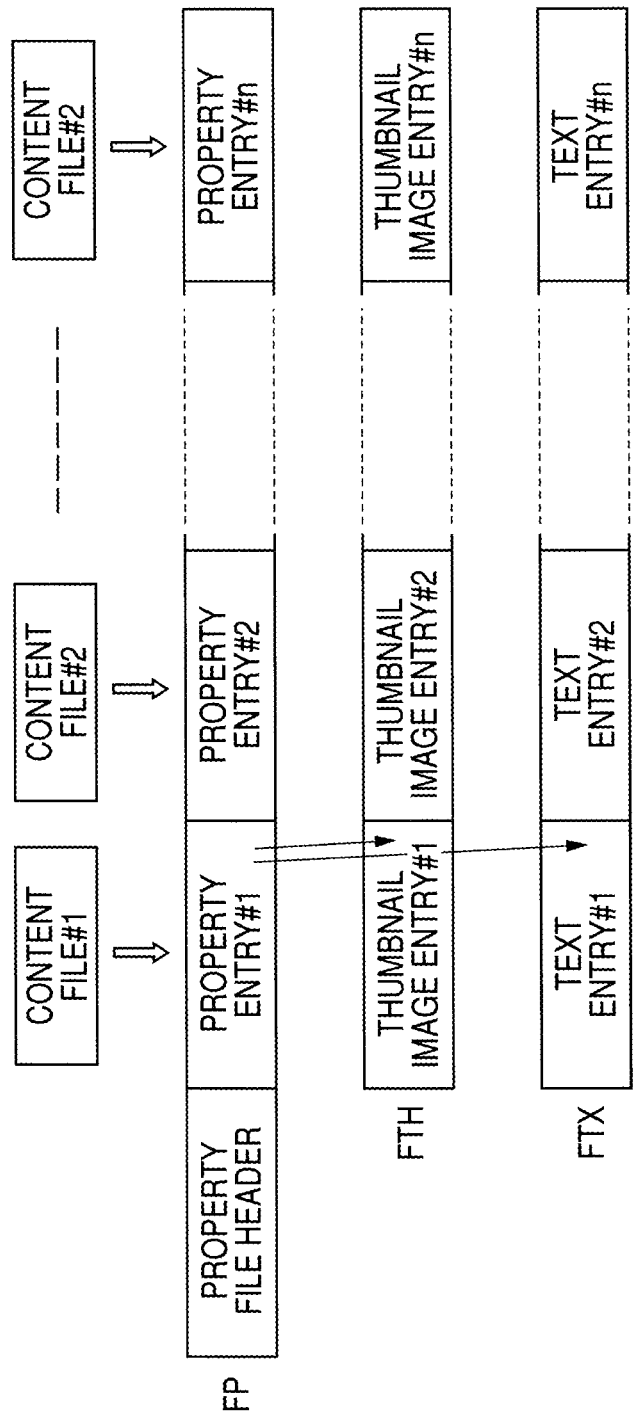
FIG. 35 is a block diagram for explaining a text file, a thumbnail image file and a property file forming an index file.
Figure 36:
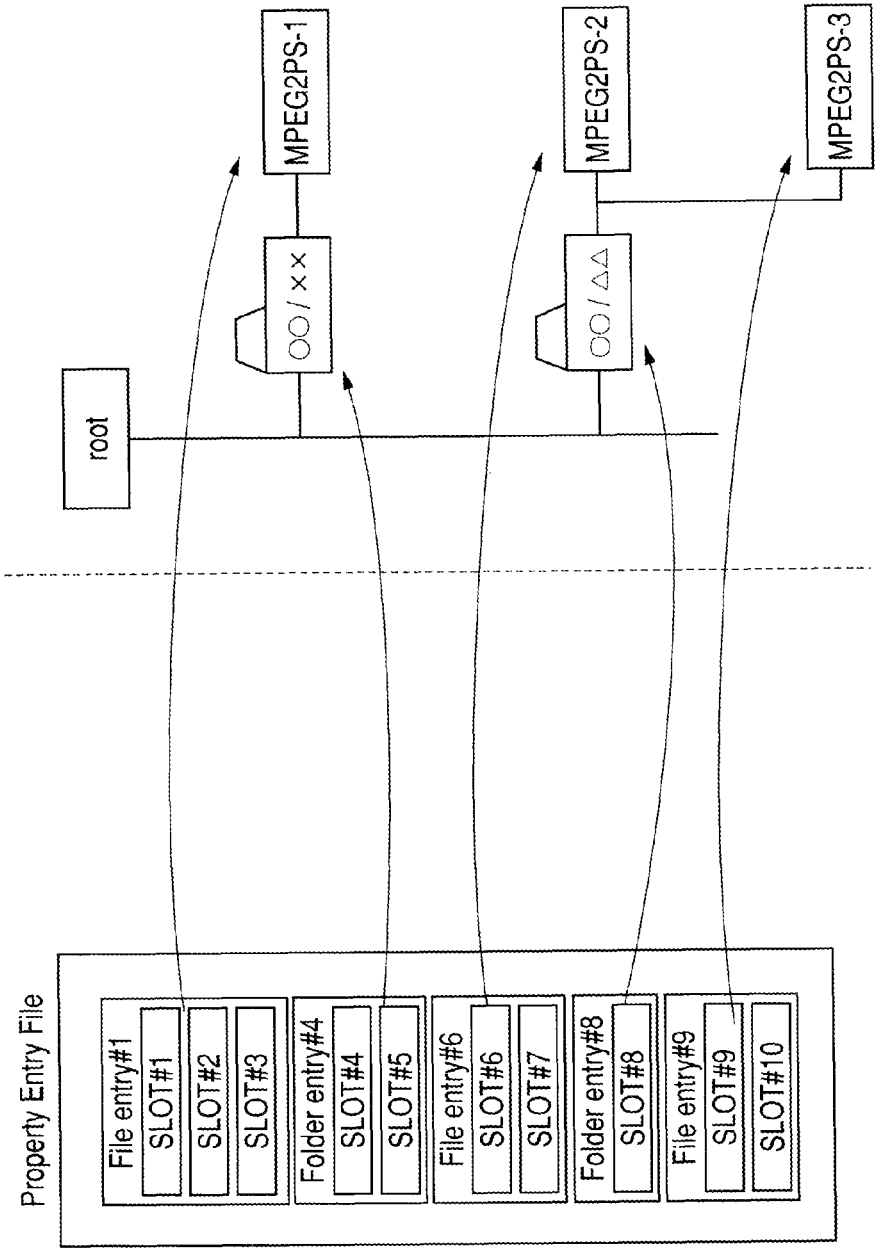
FIG. 36 is a block diagram showing an example of correspondence between the property file and, virtual folders and content files.

The details of the index file will be explained. The index file includes a text file FTX, a thumbnail image file FTH, and a property file FP in the same way as described above with reference to FIG. 35. In the embodiment, the index file including the property file FP, the thumbnail image file FTH and the text file (or metadata file) FTX is especially called as AV-Index file.

Attribute information of content files and folders relating to the content files are disposed separately in the text file FTX, the thumbnail image file FTH, and the property file FP. Each file has a structure in which entries according to attribute information of content files or folders are sequentially arranged, respectively. Each entry is formed by connecting one or plural fixed-length slots. Each entry has a management information area, respectively. The content files and the folders form a hierarchical structure in which the folders are in the upper hierarchy.

In each entry (parity entry) of the property file FP, data indicating a disk title, attributes of a content file and a folder is allocated. In each entry of the property file FP, management information which specifies corresponding entries in the text file FTX and the thumbnail image file FTH is set. In the entry of the property file FP which includes plural slots, management information specifying a next slot of the slot is set in each slot. Also in each entry of the property file FP, information which specifies a corresponding content file or a folder is set. Further, in each entry of the property file FP, information which defines a hierarchical structure of content files, existing folders and virtual folders is set.

The respective files have a structure in which fixed-length slots which are managed by a slot number indicating the number of slots from a file head are connected. The slot number forms index information indicating the order of arrangement of the fixed-length slots included in the file. In the index file, a prescribed number of entries (management information areas) in which one or plural fixed-length slots are connected are respectively provided. Each entry is identified by the slot number of head of the fixed-length slot in the connected one or plural fixed-length slots.

In each entry in the property file FP, the number of slots which are allocated to corresponding entries of other files is provided at the minimum. For example, when an entry including two slots concerning to one content file is provided in the thumbnail image file FTH and the text file FTX, at least two slots are allocated in the corresponding entry in the property file FP.

Figure 2:
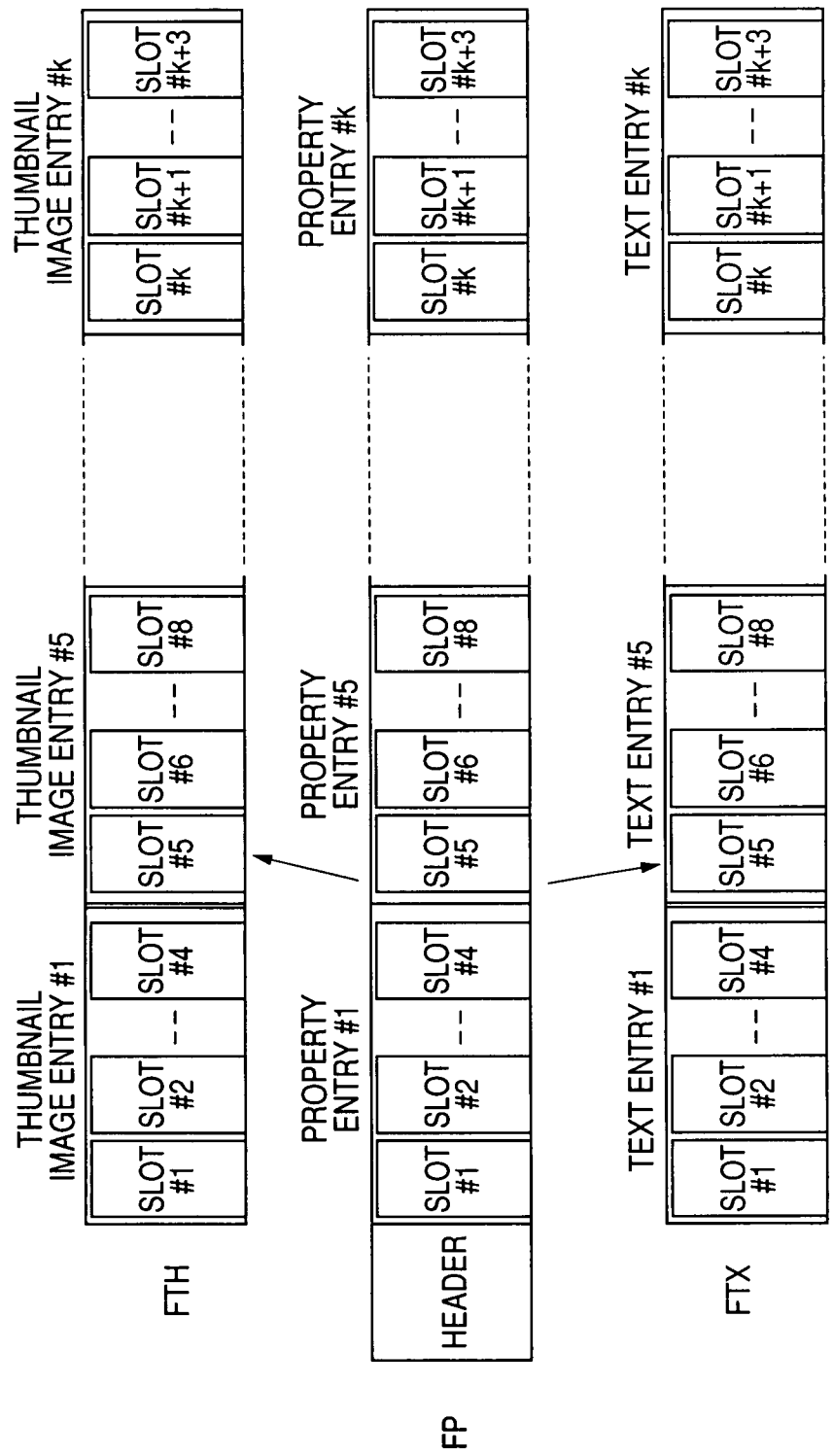
FIG. 2 is block diagram showing a configuration example of an index file.

FIG. 2 shows a configuration example of the index file. The index file includes a text file FTX, a thumbnail image file FTH and a property file FP. The files FTX, FTH and FP in FIG. 2 are examples in which each entry includes four fixed-length slots respectively.

A header of the thumbnail image file FTH is omitted, which is formed by fixed-length slots #1, #2, #3, ... connected from the file head. A header of the text file FTX is also omitted in the same way, which is formed by fixed-length slots #1, #2, #3, ... connected from the file head. On the other hand, a header is provided at the file head of the property file FP, which is formed by fixed-length slots #1, #2, #3, ... connected from the header. In the header of the property file FP, information of the thumbnail image file and information of the text file are also recorded with information of the property file.

The structure in which the thumbnail image file FTH and the text file FTX have headers respectively in the same way as the property file FP is also preferable. In that case, information of thumbnail image file is arranged at the header of the thumbnail image file FTH, and information of the text file is arranged at the header of the text file FTX.

In the text file FTX, the thumbnail image file FTH and the property file FP, entries are sequentially set respectively such as slots #1, #2, #3, ... from the file head. As described above, each entry in the text file FTX, the thumbnail image file FTH and the property file FP is identified by the slot number of the slot which is the head of slots included in the entry. In order to associate an entry in the property file FP with entries in the thumbnail image file FTH and the text file FTX (as shown by arrows in FIG. 2), a slot number for identifying a corresponding entry in the thumbnail image file FTH and the text file FTX is registered in each entry in the property file FP. For example, in the example of FIG. 2, in an entry #5 of the property file FP, a slot number indicating the entries #5 in the thumbnail image file FTH and the text file FTX is registered.

Figure 3:
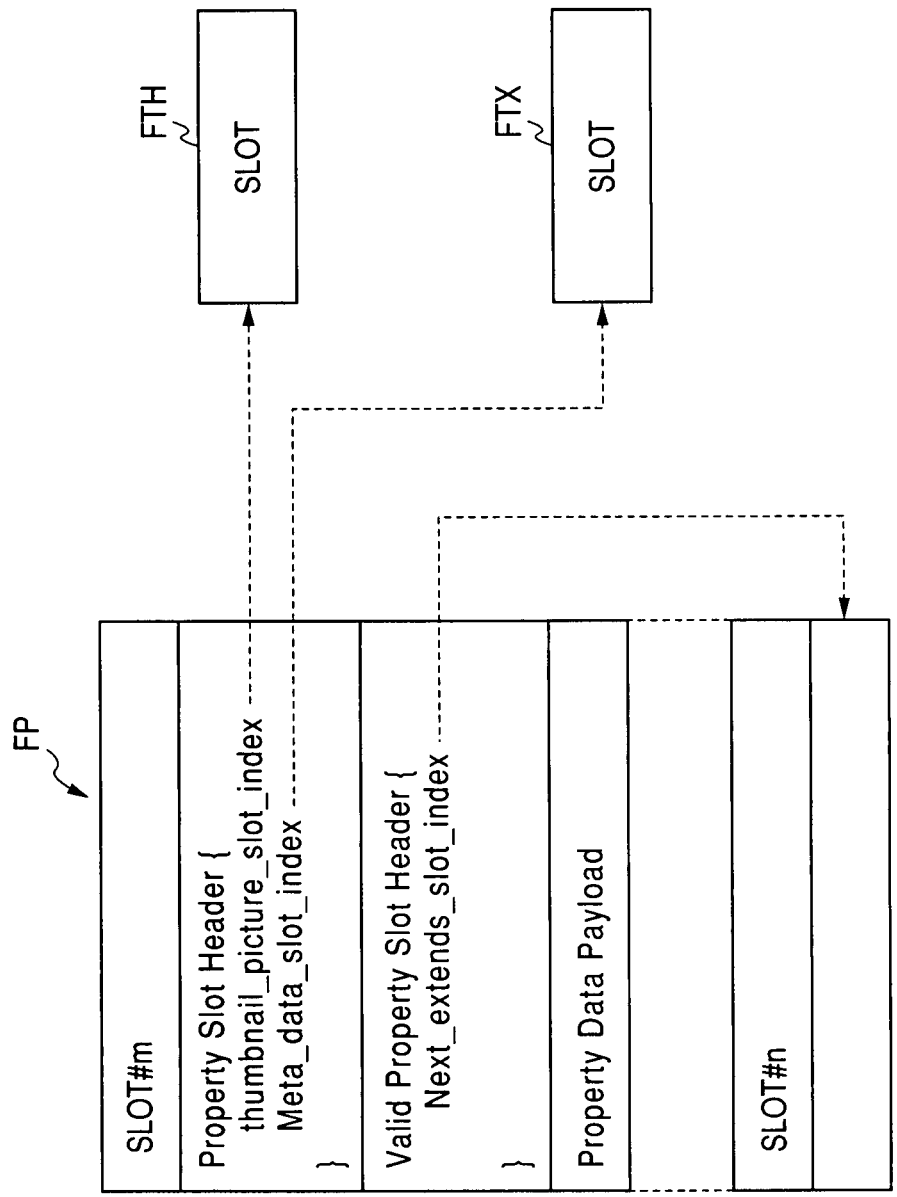
FIG. 3 is a block diagram showing a configuration of respective slots of a property file.

FIG. 3 shows a configuration of each slot of the property file FP. In each slot of the property file FP, a header (property slot header) is provided at the head thereof. In the header, an index (thumbnail_picture_slot_index) indicating a corresponding slot in the thumbnail image file, an index (Meta_data_slot_index) indicating a corresponding slot in the text file are provided as management information indicating slots of other files concerning the same content file.

When plural slots are allocated to one content file, an index indicating a next slot (Next_extends_slot_index) is provided at a next header (Valid Property Slot Header) in the plural slots other than a tail slot. The index forms management information which defines the relation to other slots in the property file concerning the same content file.

For example, when attribute information concerning one content file is allocated to three slots in the thumbnail image file, indexes (thumbnail_picture_slot_index) indicating respective corresponding slots in the thumbnail image file are provided in three slots provided in the property file. In the three slots in the property file, indexes (Next_extends_slot_index) indicating a next slot are set at two slots of the header side, which show the relation of these three slots.

Figure 4:
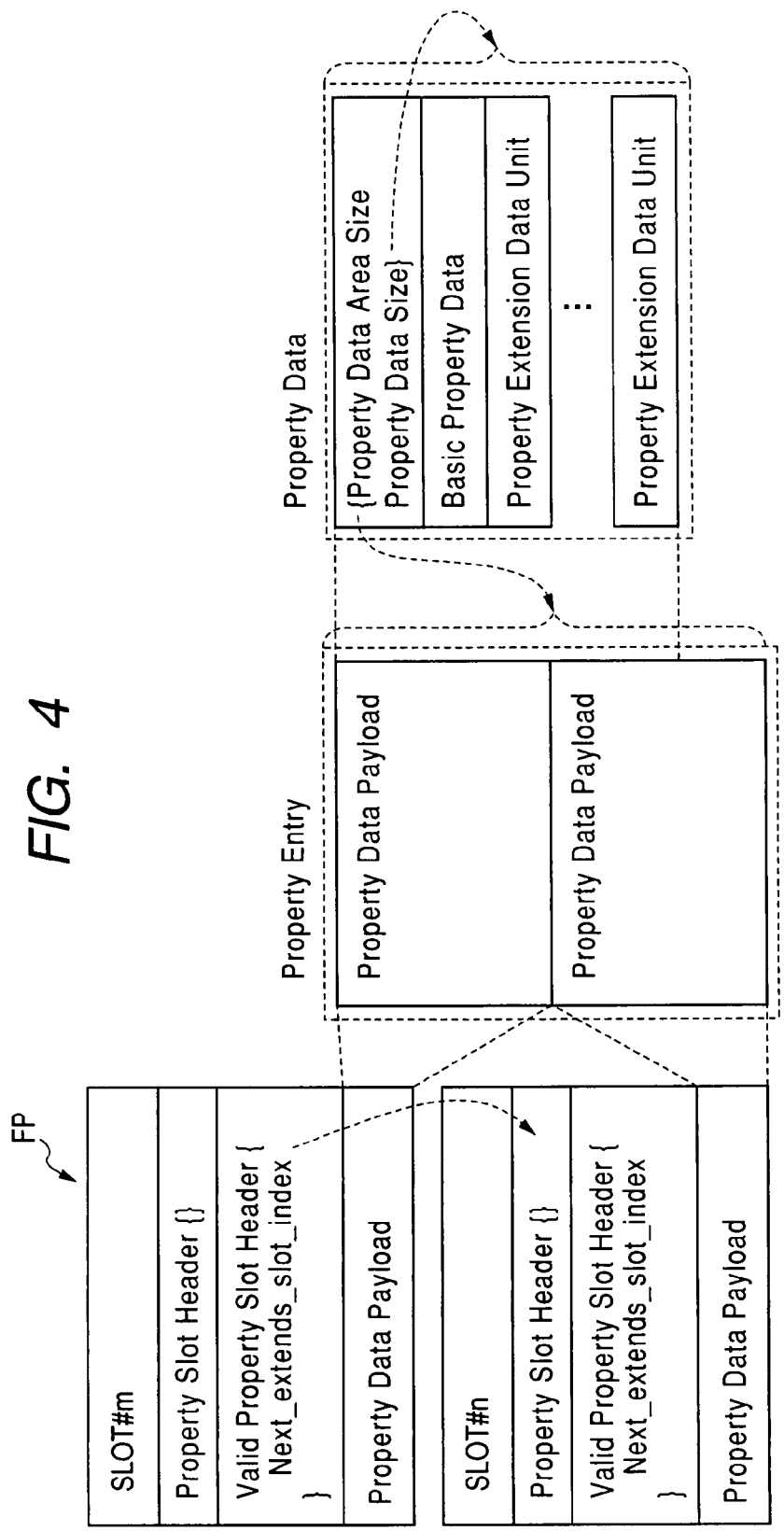
FIG. 4 is a block diagram showing a configuration of a (actual) data portion of respective slots of the property file.

FIG. 4 shows a configuration of an (actual) data portion (Property Data Payload) of each slot in the property file. In each slot, space following the above two headers is allocated as the (actual) data portion (Property Data Payload) of the property entry, and when one content file is allocated to plural slots, property data (Property Data) including attribute information concerning the content file is sequentially allocated in the actual data portions of plural slots.

In the property data (Property Data), the whole size (Property Data Area Size) of the (actual) data portions (Property Data Payload) in plural slots, the size of property data (Property Data Size) allocated to the actual data portion (Property Data Payload) in plural slots, and basic data (Basic Property Data) relating to the property entry formed by the plural slots are provided, and further, a extension data unit (Property Extension Data Unit) is sequentially added according to extension of the function of the property entry.

The whole size (Property Data Area Size) and the size of property data (Property Data Size) are recorded in the (actual) data portion of the head slot in the property entry. The system control micom 19 is capable of specifying available space of the property entry based on the size. That is to say, the size forms information which can specify available space in the property entry.

FIG. 5 shows a chart in which the property data shown in FIG. 4 is altered.

The extension data unit (Property Extension Data Unit) includes, for example, a function which defines reference relation between files and the like on the index file. In the extension data unit (Property Extension Data Unit), extension data is provided at each function. For example, when one content file is referred by another content file and is registered in a certain favorite folder at the same time, two extension data, that is, extension data corresponding to the reference by another folder and extension data indicating the favorite folder are provided in the extension data unit (Property Extension Data Unit).

Each entry on the index file is managed by the slot number from the file head. Hereinafter, to make understanding easier, index information (slot index) which specifies each entry by the slot number is appropriately written as an "entry index", and referred to as the entry number.

FIG. 6 shows a configuration of basic data (Basic property Data) relating to a folder entry in the property entry file. In the basic data (Basic Property Data), after the size is allocated at the head, a flag (entry_status_flags) which specifies a target of the entry is provided. According to setting of the flag (entry_status_flags), it is clearly specified that a registration target of the entry is a folder. In the basic data (Basic Property Data), a flag (folder_entry_status_flags) indicating the type of the folder is also provided, following the flag which specifies the above entry target. According to the flag (folder_entry_status_flags), it is specified that the folder relating to the entry is actual or virtual.

In the basic data (Basic Property Data), index information (parent_entry_index) indicating an entry of an upper hierarchy of the hierarchical structure is allocated, following the above flag indicating the type of the folder. Hereinafter, an entry corresponding to an upper hierarchy which is nearest to a folder or a content file which corresponds to one entry is referred to as a parent entry, and an entry corresponding to a lower hierarchy which is inverse relation is referred to as a child entry. The parent entry forms a first management information area and the child entry forms a second management information area. In the index information (parent_entry_index), index information (entry index) of the parent entry is allocated.

In the basic data (Basic Property Data), following the above index information (parent_entry_index), index information (previous_entry_index) which specifies an entry of the previous direction in a line of search order, and index information (next_entry_index) which specifies an entry of the later direction in a line of search order is allocated.

Furthermore, in the basic data (Basic Property Data), following the above index information (next_entry_index), the order of recording (recording_order) is allocated, and further, the number (property_extension_data_unit_count) of the extension data units (Property_Extension_Data_Unit) is allocated. Also in the basic data (Basic Property Data), generation date and time of the entry (entry_generation_time) and update date and time of the entry (entry_modification_time) are allocated, following the above number of the extension data unit.

In the basic data (Basic Property Data), following the update date and time of the above entry a flag (original_folder_status_flags) indicating the type of the existing folder is allocated, then, generation time (directory_generation_time) and update date and time (directory_modification_time) relating to a directory are allocated, and further, an identifier of the directory (Directory_Identifier) is provided.

FIG. 7 shows management information of child entry. Hereinafter, the management information of the child entry is referred to as a child entry list. The child entry list is registered in the entry by a data block of the extension data unit (Property Extension Data Unit). The example shown in FIG. 7 indicates the entry of the folder.

In the child entry list, the size is allocated at the head, next, a type of the data block (data_type) is allocated. In the example of FIG. 7, the type (data_type) indicates that it is the child entry list (Child Entry List).

In the child entry list, a type of the entry (type_of_entry) is allocated following the above type of the data block (data_type), and the type indicates that index information of the child entry described in the data block relates to a file, relates to a folder or relates to neither of them. In the index file, the child entry list is formed according to each type of the child entry relating to the folder or the content file.

In the child entry list, a later-described type of sorting (type_of_sort) is allocated following the above type of the entry (type of_entry), next, index information (entry_index) of the number of the child entries relating to the entry is allocated.

As described above, index information (entry_index) indicating the child entry is provided in a list format at the entry (parent entry) in the upper hierarchy indicated by the index information (parent_entry_index). Therefore, the system control micom 19 is capable of easily detect a relating entry in the lower hierarchy based on the index information (entry_index) when, for example, deleting the entry relating to the folder in the upper hierarchy.

For example, when display switching to the side of lower hierarchy or the side of the upper hierarchy is instructed by the user under a state in which content files recorded in a recording medium by the index file are displayed in the hierarchical structure and the like, the system control micom 19 detects entries corresponding to the display switching according to index information of the parent entry and a list of the child entry set in the entries which are displayed, and switches display to the side of lower hierarchy or the side of the upper hierarchy based on the detected result. The system control micom 19 also updates the index file so as to respond to deletion of the folder and the like.

Figure 8:
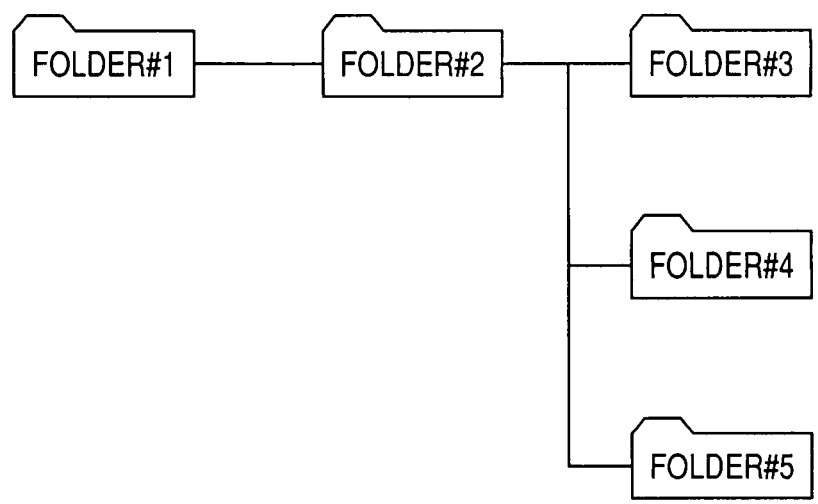
FIG. 8 is a block diagram showing an example of a hierarchical structure of folders.

Here, for example, a hierarchical structure shown in FIG. 8 is considered. Specifically, in the hierarchical structure, when a folder #2 exists in a lower hierarchy of a folder #1, and further, folders #3 to #5 exist in a lower hierarchy of the folder #2, in the index file, index information (entry_index) which specifies an entry of the folder #2 in the lower hierarchy is allocated at an entry relating to the folder #1 which is the top hierarchy in the child entry list (Child Entry List). In addition, index information (parent_entry_index) for indicating the entry relating to the folder #1 in the upper hierarchy is set at the entry of the folder #2 in the lower hierarchy.

Additionally, in the hierarchy structure, index information (entry_index) respectively indicating entries of the folders #3 to #5 in the lower hierarchy is allocated at the entry of the folder #2 by the child entry list, and index information (parent_entry_index) indicating the entry relating to the folder #2 in the upper hierarchy is respectively set at the folders #3 to #5 in the lower hierarchy.

In the hierarchical structure shown in FIG. 8, for example, when the entry relating to the folder #2 is deleted on the index file in response to the deletion of the folder #2, entries in the upper hierarchy and the lower hierarchy can be specified according to index information (parent_entry_index), (entry_index) set at the entry relating to the folder #2, as a result, a series of processing relating to deletion in the system control micom 19 can be simplified.

Figure 9:
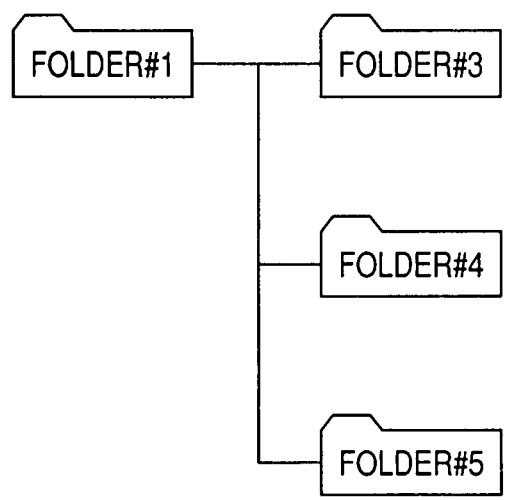
FIG. 9 is a block diagram showing an example of a hierarchical structure of folders.

FIG. 9 shows a hierarchical structure which has been changed by the deletion of the folder #2. In this case, the system control micom 19 deletes the entry of the folder #2 by setting the flag set at a slot in which the entry of the folder #2 is registered to be invalid. The system control micom 19 also updates the index information (parent_entry_index) relating to the entries of the folders #3 to #5 which has indicated the entry of the folder #2 so as to indicate the entry #1 which is the upper hierarchy of the folder #2, and further updates the index information (entry_index) relating to the entry of the folder #1 which has indicated the entry of the folder #2 so as to indicate entries of the folders #3 to #5 to execute a series of processing relating to the deletion.

It is also preferable that the system control micom 19 performs processing of deleting the entry of the lower hierarchy with the entry to be deleted, instead of the processing of rearranging the entry in the lower hierarchy of the entry to be deleted to just under the entry in the upper hierarchy of the entry to be deleted.

Figure 10:
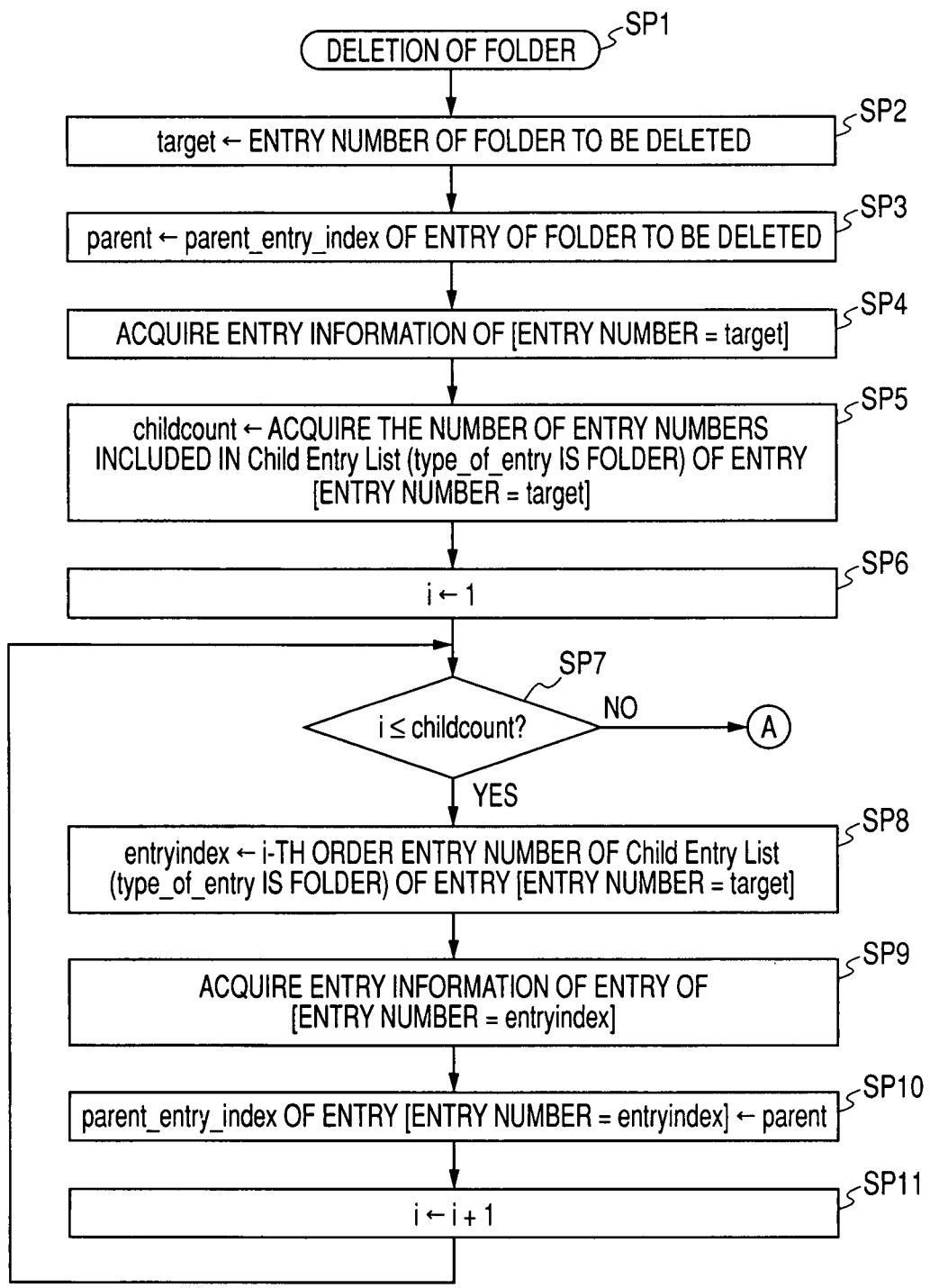
FIG. 10 is a flowchart showing processing procedures of a system control micom relating to deletion of a folder.
Figure 11:
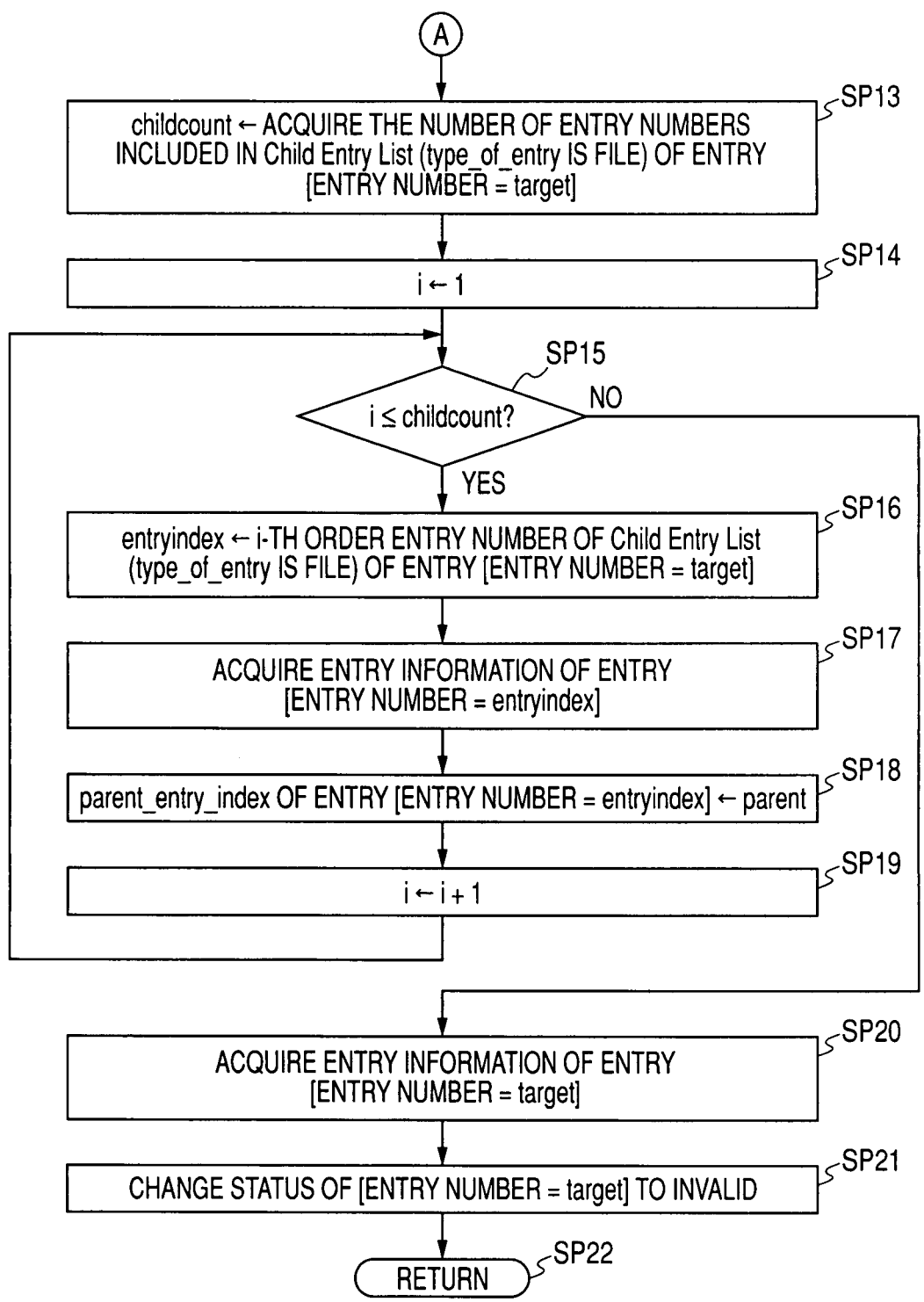
FIG. 11 is a flowchart showing processing procedures of a system control micom relating to deletion of a folder.

Flowcharts in FIG. 10 and FIG. 11 show processing procedures by the system control micom 19 concerning the deletion of the folder.

The system control micom 19 updates a directory structure of the optical disk 2 based on the instruction to delete a folder by the user and deletes the folder instructed by the user on the file management system of the recording medium 2. When a folder is deleted on the file management system, or when deletion of a virtual folder is instructed by the user, the system control micom 19 proceeds from step SP1 to step SP2. In the step SP2, the system control micom 19 sets an entry number (index information) which specifies an entry of the folder to be deleted as a target.

In the next step SP3, the system control micom 19 loads a record of the target entry from the index file and acquires index information (parent_entry_index) of a parent entry recorded in the entry. In the next step SP4, the system control micom 19 acquires a data block formed by a corresponding extension data unit (Property Extension Data Unit) from the record of the entry of the folder to be deleted.

In the next step SP5, the system control micom 19 detects a list in which the entry type (type_of_entry) is set as the folder from child entry lists by the extension data unit (Property Extension Data Unit) and detects the number of index information (entry_index) of the child entry from the list of the folder.

In the next step SP6, the system control micom 19 performs initialization by setting a value of a variable "i" to a value "1", which corresponds to the detected number. After that, in step SP7, the system control micom 19 judges whether the value of the variable "i" is equal to or less than the number of index information (entry_index) or not. When it is judged that the value of the variable "i" is equal to or less than the number of index information (entry_index), the system control micom 19 proceeds from step SP7 to step SP8. In step SP8, the system control micom 19 acquires index information (entry_index) of the order specified by the variable "i" from the index information (entry_index) of the child entry recorded in the extension data unit (Property Extension Data Unit). In the next step SP9, the system control micom 19 acquires information of the child entry which is specified by the index information (entry_index) acquired in the step SP8.

In the next step SP10, the system control micom 19 updates the index information (parent_entry_index) of the parent entry which is recorded in the acquired child entry to the index information (parent_entry_index) detected in the step SP3. Then, the system control micom 19 increments the variable "i" by a value "1" in the next step SP11, then, returns to step SP7.

The system control micom 19 repeats the processing procedures of steps SP7-SP8-SP9-SP10-SP11-SP7 for respective index information (entry_index) of the child entries relating to the folder registered in the list, and sequentially updates index information (parent_entry_index) of the parent entry registered at the child entries of the entry to be deleted concerning the entry of the folder.

When all updates of child entries are completed, the variable "i" becomes larger than the number of index information (entry_index) in step SP7, therefore, the system control micom 19 proceeds from step SP7 to step SP13 (FIG. 11).

According to the above processing of respective steps, with respect to respective child folders positioned in the lower hierarchy of the folder as a deletion target, the system control micom 19 updates the record of the corresponding entries so that the parent folder positioned in the upper hierarchy of the child folders is rearranged from the folder to be deleted to the folder positioned in the upper hierarchy of the folder to be deleted.

In step SP13, the system control micom 19 detects anew a list in which the type of the entry (type_of_entry) is set as the file and detects the number of index information (entry_index) of the child entries from the list of the file.

In the next step SP14, the system control micom 19 performs initialization by setting a value of a variable "i" to a value "1", which corresponds to the detected number. After that, in the step SP15, the system control micom 19 judges whether the value of the variable "i" is equal to or less than the number of index information (entry_index) detected in step SP13 or not. When it is judged that the value of the variable "i" is equal to or less than the number of index information (entry_index), the system control micom 19 proceeds from step SP15 to step SP16.

In the step SP16, the system control micom 19 acquires index information (entry_index) of the order which is specified by the variable "i" from index information (entry_index) of child entries recorded in the extension data unit (Property Extension Data Unit). In step SP17, the system control micom 19 acquires information of the child entry specified by the index information (entry_index) acquired in the step SP16.

In the next step SP18, the system control micom 19 updates index information (parent_entry_index) of the parent entry recorded in the acquired child entry to the index information (parent_entry_index) detected in step SP3. Then, the system control micom 19 increments the variable "i" by a value "1" in the next step SP19 and returns to step S15.

The system control micom 19 repeats processing procedures of steps SP15-SP16-SP17-SP18-SP19-SP15 for each index information (entry_index) of the child entries relating to the folder registered in the list, and sequentially updates index information (parent_entry_index) of the parent entry registered at the child entries of the entry to be deleted concerning the entry of the content file.

When all updates of child entries are completed, the variable "i" becomes larger than the number of index information (entry_index) in step SP15, and the system control micom 19 proceeds from step SP15 to step SP20.

According to the above processing of respective steps, with respect to respective child files positioned in the lower hierarchy of the folder as a deletion target, the system control micom 19 updates the record of the corresponding entry so that the parent folder positioned in the upper hierarchy of the child folders is rearranged from the folder to be deleted to the folder positioned in the upper hierarchy of the folder to be deleted.

In step S20, the system control micom 19 acquires information of the entry set as the target in step SP2, and in the next step S21, setting of slots relating to the entry set as the target to be invalid. After that, the system control micom 19 proceeds to step SP22 and returns to a first processing procedure.

The system control micom 19 updates index information (entry_index) indicating the entries in the lower hierarchy with respect to the parent entry at the same time as the above processing relating to the child entry.

In the embodiment, as described above, index information indicating child entries is provided in the parent entry, further, the index information is provided in the list format, thereby simplifying processing relating to update and deletion.

As described above, flowcharts of FIG. 10 and FIG. 11 show processing procedures of the system control micom 19 when index information indicating child entries is provided at the parent entry.

Figure 12:
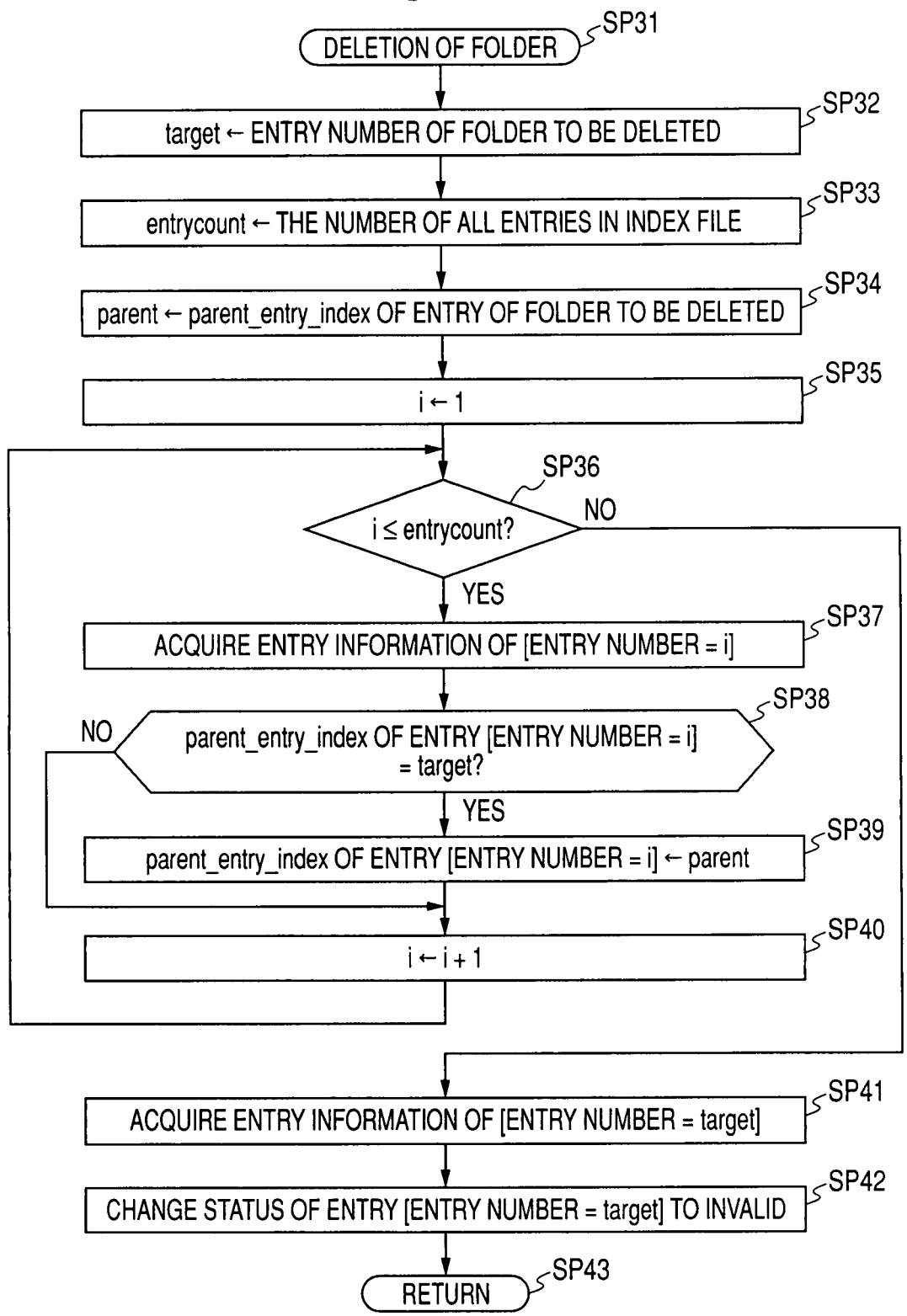
FIG. 12 is a flowchart showing processing procedures of the system control micom when index information indicating the child entry is not provided in a parent entry.

A flowchart of FIG. 12 shows processing procedures of the system control micom 19 when index information indicating child entries is not provided at the parent entry. The flowchart of FIG. 12 is shown as a comparison example with respect to the above flowcharts of FIG. 10 and FIG. 11.

When a folder is deleted on the file management system, or when deletion of a virtual folder is instructed by the user, the system control micom 19 proceeds from step SP31 to step SP32. Then, in the step SP32, the system control micom 19 sets the entry number (index information) which specifies an entry of a folder relating to deletion as a target.

In the next step SP33, the system control micom 19 detects the number of all entries in the index file. In addition, in the next step SP34, the system control micom 19 acquires index information (parent_entry_index) of the parent entry recorded at the entry to be deleted.

Furthermore, the system control micom 19 performs initialization by setting a value of a variable "i" to a value "1", which relates to search of the entry in the next step SP35. In the next step SP36, the system control micom 19 judges whether the value of the variable "i" is smaller than the number of all entries recorded in the index file or not. When it is judged that the value of the variable "i" is equal to or less than the number of all entries, the system control micom 19 proceeds from step SP36 to step SP37.

In the step SP37, the system control micom 19 acquires information of an entry of the order by the variable "i" from the index file. Then, in the next step SP38, the system control micom 19 judges whether index information (parent_entry_index) of the parent entry in the entry acquired in the step SP37 indicates the entry to be deleted or not.

When index information (parent_entry_index) of the parent entry in the acquired entry indicates the entry to be deleted, the system control micom 19 proceeds from step S38 to step SP39. The system control micom 19 updates index information (parent_entry_index) of the parent entry in the entry acquired in the step S37 to index information of the parent entry of the entry to be deleted in step S39, and proceeds to step SP40 after that.

In the above step S38, when index information (parent_entry_index) of the parent entry in the acquired entry does not indicate the entry to be deleted, the system control micom 19 immediately proceeds from step S38 to step S40. The system control micom 19 increments the variable "i" further by a value "1" in the step S40, then, returns to step S36.

According to processing of respective steps, the system control micom 19 sequentially detects respective entries registered in the index file, confirms whether the parent entry is the entry to be deleted based on index information (parent_entry_index) of the parent entry, and when the parent entry is the entry to be deleted, updates index information (parent_entry_index).

When processing of all entries is completed, the variable "i" becomes larger than the number of all entries in step SP36, and the system control micom 19 proceeds from step SP36 to step SP41.

The system control micom 19 acquires entry information in step SP41, which has been set as the target in step SP32, setting of slots relating to the entry set as the target to be invalid in step SP42. After that, the system control micom 19 proceeds to step SP43 and returns to the first processing procedure.

As described above, if index information indicating child entries is not registered in the parent entry in the list, the system control micom 19 have to repeat processing of steps SP36-SP-37-SP38-SP-39-SP40-SP-36 or steps SP36-SP37-SP38-SP40-SP36 with respect to all entries registered in the index file, which requires time.

The update processing of index information which defines the hierarchical structure becomes necessary not only when deleting the folder but also when deleting a file or when moving a folder or a file. Also in update processing of index information when the file is deleted or when the folder or the file is moved, as in the above update processing of index information when deleting the folder, if index information indicating child entries is not registered in the parent entry in the list, the system control micom 19 have to update corresponding index information by searching all entries registered in the index file, which requires time.

In the embodiment, index information of child entries is registered in the parent entry in the list, therefore, the system control micom 19 is capable of performing processing relating to deletion or movement of the folder or the content file at high speed and also capable of executing processing relating to change of the hierarchical structure managed by the index file easily and rapidly.

The system control micom 19 updates the index file in response to each processing not only when deleting the folder but also when deleting the content file, or when recording or moving the folder and the content file and on other occasions. In the update of the index file, the system control micom 19 detects entries in which update is necessary based on index information of the child entry list and index information of the parent entry, and updates the entry records in response to each processing.

(3) Management Information of Sorting

When recording, deletion and movement of content files are repeated on the optical disk 2, the index file is updated in response to the recording, deletion and movement. In this case, it becomes hard to see in what order entries relating to the content files are registered in the index file.

In the case that several thousand of content files are recorded in the optical disk 2, the number of content files which belongs to one folder becomes huge. In this case, user usability can be improved by, for example, sorting and displaying content files belonging to one folder according to the order of recording date and time and so on.

However, when the number of content files belonging to one folder is huge, it is difficult to ignore time required for such sorting, which decreases user usability and puts stress to the user.

Accordingly, in the embodiment, in a data block of an extension data unit (Property Extension Data Unit) relating to a child entry list (refer to FIG. 7), the order of index information (entry_index) of the child entry to be recorded next is defined by the type of sorting (type of sort), and index information (entry_index) of the child entries is sequentially recorded according to the definition.

As the type of sorting (type_of_sort), "not sorted", "ascending order of generation date and time", "descending order of generation date and time", "ascending order of update date and time", "descending order of update date and time" and the like can be defined. When the type of sorting (type_of_sort) is defined as "not sorted", sequential index information (entry index) of the child entries is held in a state which is changed by recording, deletion, movement and the like without being sorted.

When the type of sorting (type_of_sort) is defines as "ascending order of generation date and time", the system control micom 19 sequentially allocates following index information (entry_index) of child entries according to the generation order of corresponding content files or folders (corresponding to generation date and time (entry_generation_time) of entries of basic data). When the type of sorting (type_of_sort) is defined as "descending order of generation date and time", the system control micom 19 allocates following index information (entry_index) of child entries according to the inverse order of the "ascending order of generation date and time".

When the type of sorting (type_of_sort) is defined as "ascending order of update date and time", the system control micom 19 sequentially allocates following index information (entry_index) of child entries according to the update order of corresponding content files or folders (corresponding to update date and time (entry_modification_time) of entries of basic data). And further, the type of sorting (type_of_sort) is defined as "descending order of update date and time", the system control micom 19 allocates index information (entry_index) of child entries according to the inverse order of the "ascending order of update date and time".

The system control micom 19 provides a content files belonging to the folder designated by the user and the index file by utilizing the type of sorting (type_of_sort) efficiently.

The system control micom 19 registers an entry in the index file so as to correspond to recording of the content file, and adds index information (entry_index) indicating the registered entry in a child entry list relating to a parent entry of the registered entry. At this time, the system control micom 19 adds index information (entry_index) according to the type of sorting (type_of_sort) which has been previously set by the user.

Figure 13:
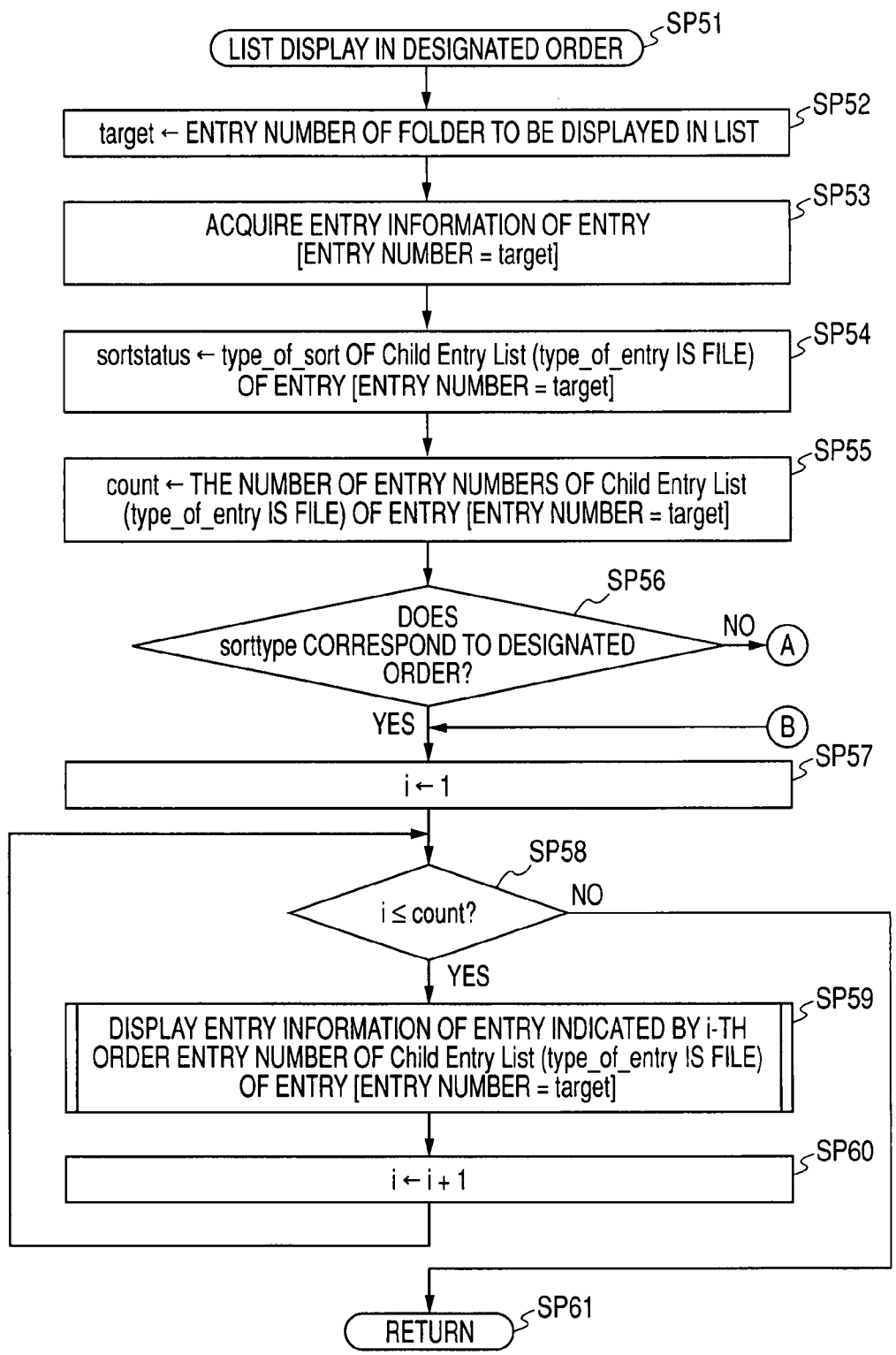
FIG. 13 is a flowchart showing processing procedures of the system control micom when content files belonging to the folder are displayed in a list.
Figure 14:
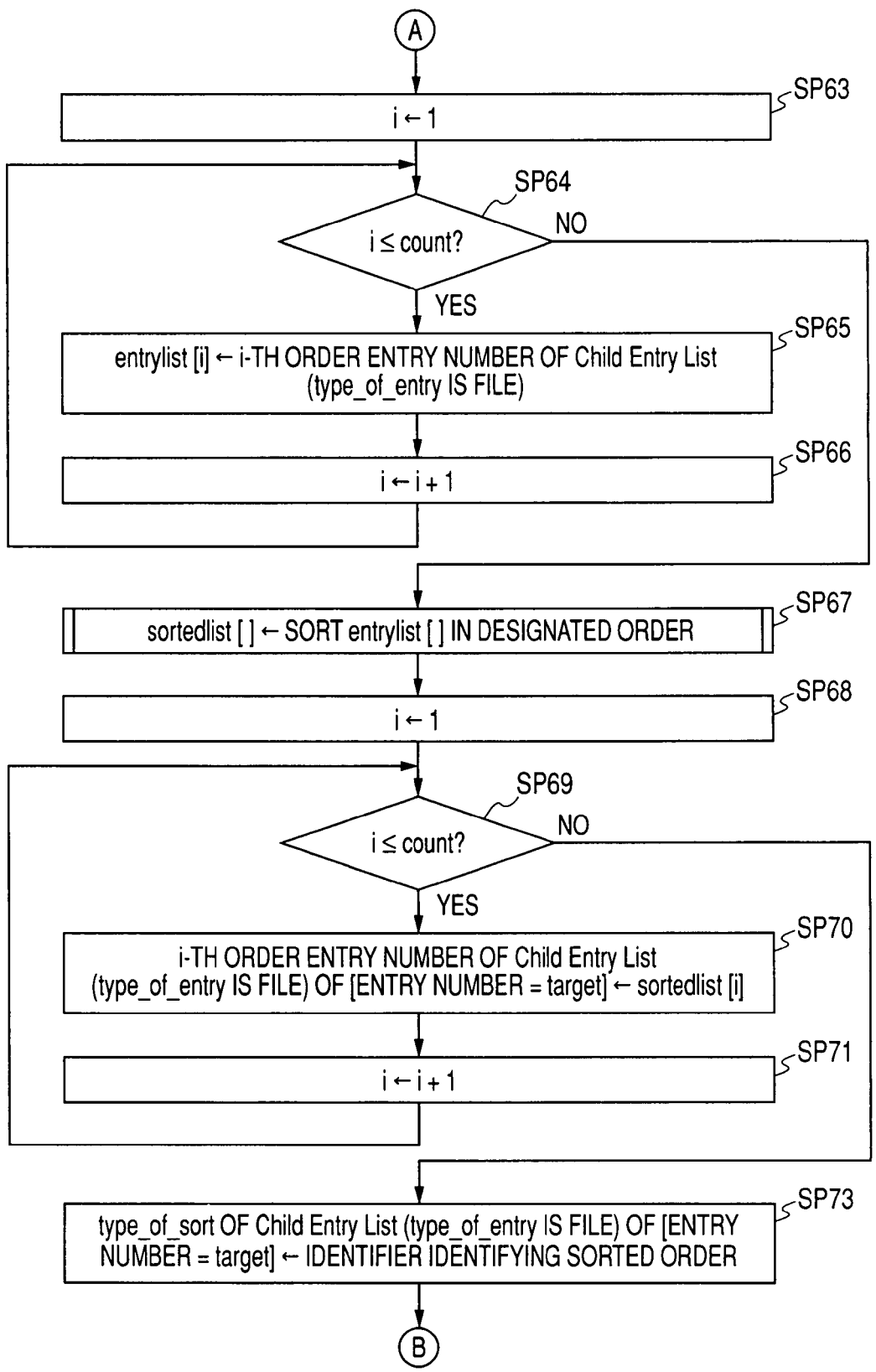
FIG. 14 is a flowchart showing processing procedures of the system control micom when content files belonging to the folder are displayed in a list.

Flowcharts of FIG. 13 and FIG. 14 show processing procedures of the system control micom 19 when content files belonging to a folder are displayed in a list by user instruction. The system control micom 19 proceeds from step SP51 to SP52 by a user instruction for list display. In step SP52, the system control micom 19 sets an entry number (index information) which specifies an entry of a folder whose list display is instructed as a target. In next step SP53, the system control micom 19 loads record of the target entry from the index file and acquires information recorded in the entry.

In next step SP54, the system control micom 19 selects an extension data unit (Property Extension Data Unit) in which the type of a data block (extends_data_type) is set in a child entry list as well as the type of the entry (type_of_entry) is set as a content file from the acquired information. In next step SP55, the system control micom 19 detects the number of index information (entry index) registered in the child entry list of the selected extension data unit (Property Extension Data Unit).

Next, the system control micom 19 judges whether the type of sorting (type_of_sort) set in the selected extension data unit (Property Extension Data Unit) corresponds to the order in which list display is instructed by the user in step SP56. When the type of sorting (type_of_sort) corresponds to the order in which list display is instructed by the user, the system control micom 19 proceeds from step SP56 to step SP57.

In the SP57, the system control micom 19 initialize a variable "i" to a value "1", which corresponds to the number of index information (entry index) detected in step SP55. After that, the system control micom 19 judges whether the value of the variable "i" is equal to or less than the number of index information (entry_index) detected in step SP55. When the value of the variable "i" is equal to or less than the number of index information (entry_index), the system control micom 19 proceeds from step SP58 to step SP59.

In step SP59, the system control micom 19 acquires information of the corresponding entry according to index information (entry_index) which is recorded in the i-th order in the child entry list. When the user instructs list display by thumbnail images, the system control micom 19 detects a corresponding entry in the property file FP according to index information (entry_index) and searches a corresponding entry in the thumbnail image file FTH based on index information (thumbnail_picture_slot_index) of the thumbnail image file FTH which is recorded in the entry to acquire the thumbnail image data.

When the user instructs list display according to titles, the system control micom 19 detects a corresponding entry in the property file FP by the index information (entry_index) and searches a corresponding entry in the text file FTX based on index information (Meta_data_slot_index) of the text file FTX recorded in the entry to acquire text data.

In step SP59, the system control micom 19 displays the acquired entry information (thumbnail images, titles and the like) when acquiring entry information as descried above. Then, the system control micom 19 increments the variable "i" by a value "1" in the next step SP60, then, returns to step SP58.

When the child entry list is recorded in the order in which the user instructs the list display, the system control micom 19 sequentially acquires entry information of corresponding entries according to the order of record of the list. In this case, when entry information with respect to all index information (entry_index) recorded in the list is acquired, the variable "i" becomes larger than the number of index information (entry_index) in step SP58, and the system control micom 19 proceeds from step SP58 to step SP61 to end the processing procedures.

According to the processing of above respective steps, when the type of sorting (type_of_sort) corresponds to the order in which the user instructs the list display, the system control micom 19 provides entry information according to the acquired order and displays content files in a list, which belongs to the folder which is instructed by the user.

In step SP56, when the type of sorting (type_of_sort) does not correspond to the order in which the user instructs the list display, the system control micom 19 proceeds from step SP56 to step SP63. As a case in which the type of sorting does not correspond to the order in which the user instructs the list display, for example, a case can be cited, in which the user instructs the list display according to the order from a new record, whereas the type of sorting (type-of-sort) recorded in entry relating to the folder selected by the user is "ascending order of generation date and time".

In step SP63, the system control micom 19 initializes a value "i" to a value "1", which corresponds to the number of index information (entry_index) detected in step SP55. After that, in step S64, the system control micom 19 judges whether a value of the variable "i" is smaller than the number of index information (entry_index) detected in step SP55 or not. When the value of variable "i" is smaller than the number of index information (entry_index), the system control micom 19 proceeds from step SP64 to step SP65.

In step SP65, the system control micom 19 acquires index information (entry_index) recorded in the i-th order in the child entry list. The system control micom 19 increments the variable "i" by a value "1" in the next step SP66, then, returns to step SP64. The system control micom 19 sequentially detects index information (entry_index) recorded in the child entry list. In this case, when all index information (entry_index) recorded in the child entry list is detected, the value of the variable "i" becomes larger than the number of index information (entry_index) in step 64, and the system control micom 19 proceeds from step SP64 to step SP67.

In step SP67, the system control micom 19 generates a list of index information (entry_index) according to the sort result by sorting the index information (entry_index) recorded in the child entry list based on the order in which the user instructs the list display. The system control micom 19 detects entry information of child entries according to the index information (entry_index) acquired in step SP65 and performs sorting based on the generation date and time (entry_generation_time) of the entries and the update date and time of the entries (entry_modification_time) allocated to the entry information.

Next, the system control micom 19 initializes the variable "i" to a value "1" in step SP68, then, judges whether the variable "i" is equal to or less than the number of the index information (entry_index) detected in step SP55 or not. When the variable "i" is equal to or less than the number of index information (entry_index), the process of the system control micom 19 proceeds from step SP69 to step SP70.

In step SP30, the system control micom 19 rewrites the i-th index information (entry_index) in the child entry list recorded in the index file to the i-th index information (entry_index) recorded in the list of index information (entry_index) according to the sort result, and increments the variable "i" by a value "1" in the next step SP71.

The system control micom 19 sequentially updates index information (entry_index) relating to the child entry list recorded in the index file into index information sorted by the processing of step SP67 and updates the order of index information (entry_index) included in the child entry list which is recorded in the parent entry into the order of display instructed by the user.

When the update processing is completed, the value of the variable "i" becomes larger than the number of index information (entry_index) in step SP69, the process of the system control micom 19 proceeds from step SP69 to step SP73. The system control micom 19 updates the record of the type of sorting (type_of_sort) into an identifier indicating the order in which list display is instructed in step SP73, and after that, the process proceeds to the above described step SP57.

According to the processing in respective steps, when the child entry list is not recorded in the order in which the user instructed the list display, the system control micom 19 sorts the record of the list into the order in which the user instructed the list display to update the record, after that, displays content files in the list which belongs to the folder instructed by the user in the order according to the updated record.

In the embodiment, when the order in which the user instructs the list display corresponds to the order of the child entry list, the system control micom 19 is capable of displaying attribute information (thumbnail images, titles and the like) of the content files in the list in the order instructed by the user without performing any sorting processing, thereby remarkably shortening time required for the list display as compared with related arts, which improves user usability.

As a method of shortening processing time required for list display, a caching method can be applied. However, when applying the caching method, it is necessary to secure a memory for performing caching. According to the embodiment, the list display can be performed in a short time without securing such memory, thereby simplifying the configuration and improving usability of equipment whose resources are limited.

In the embodiment, when sorting is necessary, the child entry list is rewritten according to the sort result. Though the rewriting processing requires time, in the list display after the rewriting processing, sorting processing can be omitted by efficiently using the rewritten list, as a result, list display can be performed in a short time, which improves user usability.

Figure 15:
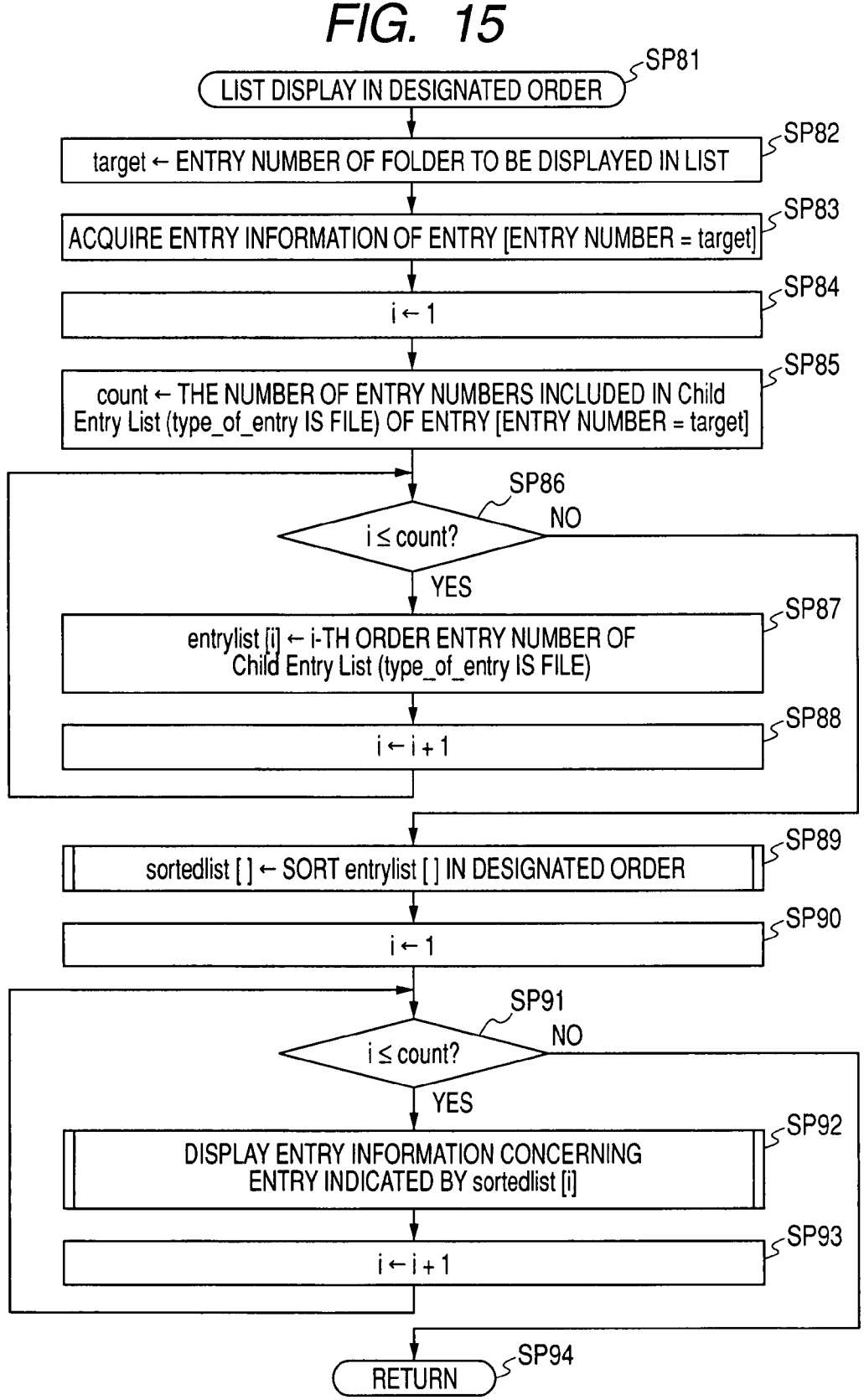
FIG. 15 is a flowchart (comparative example) showing processing procedures of the system control micom when content files belonging to the folder are displayed in a list.
Figure 16:
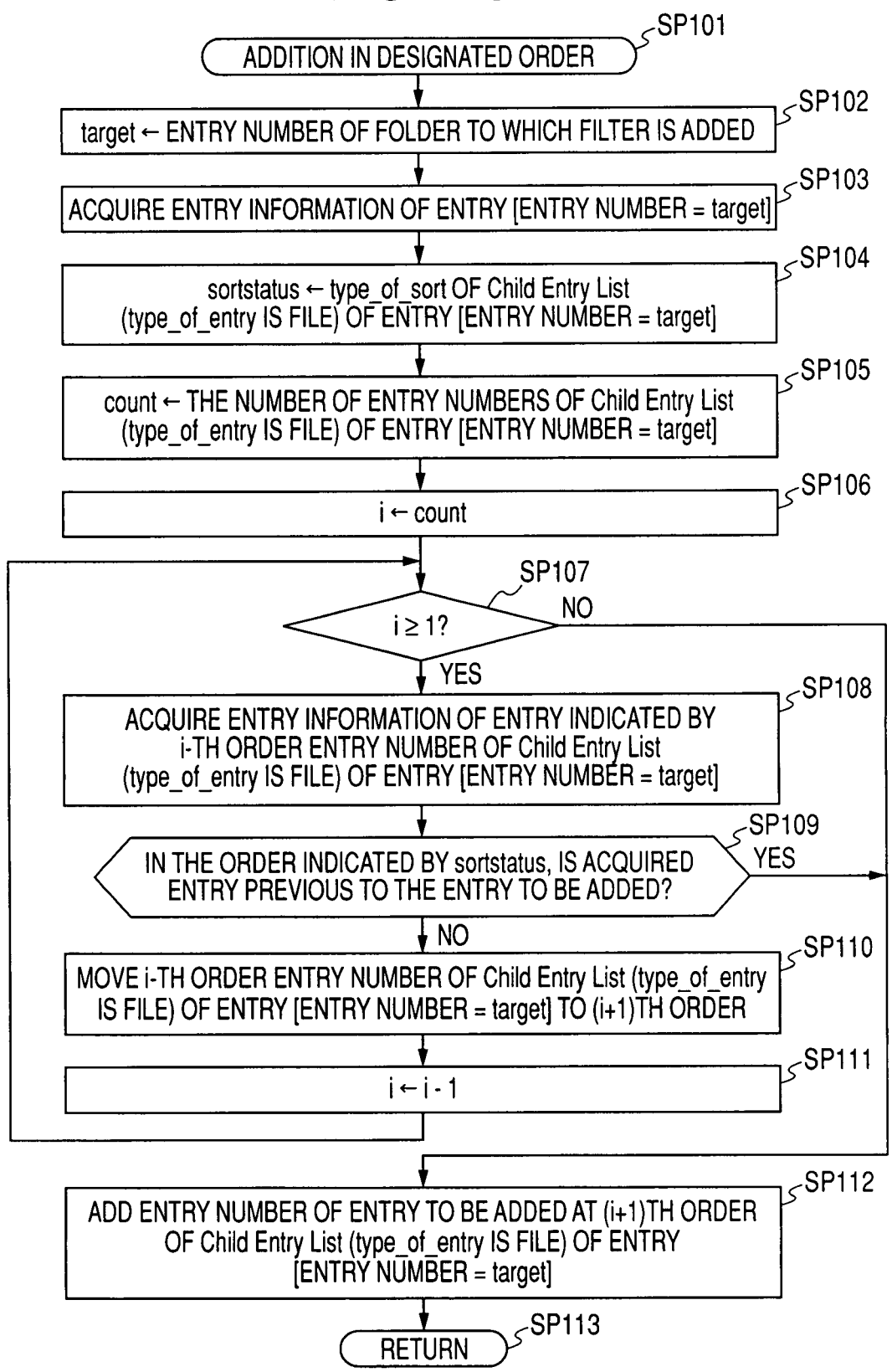
FIG. 16 is a flowchart (comparative example) showing processing procedures of the system control micom when content files belonging to the folder are displayed in a list.

Flowcharts of FIG. 15 and FIG. 16 show processing procedures of the system control micom 19 which can be considered in the case that the type of sorting (type_of_sort) and index information (entry_index) sorted according to the type of sorting are not recorded in the child entry list. The flowcharts of FIG. 15 and FIG. 16 are shown as a comparative example with respect to the flowcharts of FIG. 13 and FIG. 14.

The system control micom 19 proceeds from step SP81 to step SP82 according to an instruction of list display by the user. In step SP82, the system control micom 19 sets an entry number (index information) which specifies the entry of the folder whose list display is instructed as a target. In the next step SP83, the system control micom 19 loads the record of the target entry from the index file and acquires information recorded in the entry.

In the next step SP84, the system control micom 19 initializes a variable "i" to a value "1". Then, in step SP85, the system control micom 19 detects the number of index information (entry_index) from the child entry list recorded in the entry information acquired in step SP83. In the next step SP86, the system control micom 19 judges whether the value of the variable "i" is equal to or less than the number of index information (entry_index) or not.

When the value of the variable "i" is equal to or less than the number of index information (entry_index), the system control micom 19 proceeds from step SP86 to step SP87. The system control micom 19 detects index information (entry_index) recorded in the i-th order in the child entry list in the step SP87. The system control micom 19 increments the variable "i" by a value "1" in the next step SP88, after that, returns to step SP86. The system control micom 19 sequentially detects index information (entry_index) recorded in the child entry list.

When all index information (entry_index) recorded in the child entry list has been detected, the value of the variable "i" becomes larger than the number of index information (entry_index) in step SP86, and the system control micom 19 proceeds from step SP86 to step SP89.

In the step SP89, the system control micom 19 sorts the acquired index information (entry_index) in the step SP89, then, initializes the variable "i" to a value "1" in the next step SP90. In the next step SP91, the system control micom 19 judges whether the variable "i" is equal to or less than the number of index information (entry_index) detected in step SP85 or not.

The value of the variable "i" is equal to or less than the number of index information (entry_index), the system control micom 19 proceed from step SP91 to step SP92. In the step SP92, the system control micom 19 detects the i-th index information (entry_index) from the sort result of step SP89 and acquires entry information to be displayed based on the index information (entry_index). The system control micom 19 increments the variable "i" in the next step SP93, after that, returns to step SP91.

When the value of the variable "i" is larger than the number of index information (entry_index) in the step SP91, the system control micom 19 proceeds from step SP91 to step SP94 to end the processing procedures.

As described above, when the type of sorting (type_of_sort) and index information (entry_index) sorted according to the type of sorting are not recorded in the child entry list, it is necessary that the system control micom 19 sorts index information (entry_index) required for the list display every time the list display is instructed by the user, which makes time required for the list display longer.

In the embodiment, it is not necessary that the system control micom 19 sorts entry information required for the list display every time the list display is instructed by the user, thereby improves user usability.

The flowchart of FIG. 16 shows registration processing of the child entry list when registering an entry by recording a content file. The system control micom 19, after registering the entry of the content file in the index file, begins to register the child entry list, proceeding from step SP101 to step SP102.

In step SP102, the system control micom 19 detects the entry number (index information (entry_index)) concerning the folder as a target, to which the newly recorded content file belongs. In the next step SP103, the system control micom 19 loads the record of the target entry in the index file and acquires information recorded in the target entry.

In the next step SP104, the system control micom 19 selects an extension data unit (Property Extension Data Unit) in which the type of data block (extends_data_type) is set as the child entry list and the type of entry (type_of_entry) is set as the content file based on the acquired information. The system control micom 19 also detects the type of sorting (type_of_sort) from the child entry list by the extension data unit (Property Extension Data Unit).

In the next step SP105, the system control micom 19 detects the number of index information (entry_index) recorded in the child entry list. In step SP106, the system control micom 19 initializes the variable "i" by setting the number to the variable "i", then, proceeds to step SP107.

In step SP107, the system control micom 19 judges whether the variable "i" is equal to or more than "1". When the variable "i" is equal to or more than "1", the system control micom 19 proceeds from step SP107 to step SP108. In the step SP108, the system control micom 19 acquires information of a corresponding property entry based on index information (entry_index) recorded in the i-th order in the child entry list.

In the next step SP109, the system control micom 19 determines an entry generation date and time (entry_generation_time) or an entry update date and time (entry_modification_time) in information of the acquired property entry according to the sorting order detected in step SP104 and judges whether the sorting order of the acquired property entry is previous to the newly added entry or not. When the sorting order the acquired property entry is later than the newly added entry, the process of the system control micom 19 proceeds from step SP109 to step SP110.

In the step SP109, the system control micom 19 re-registers index information (entry_index) in the (i+1)th order, which has been registered in the i-th order in the child entry list, and moves the i-th index information (entry_index) to the end side of the sorting order. Also the system control micom 19 decrements the variable "i" by a value "1" in step SP111, then, returns to step SP107.

According to the above processing of respective steps, the system control micom 19 moves the index information (entry_index) which is recorded in the child entry list to the end side one by one from the end side, until the order of index information (entry_index) to be newly registered comes.

When the order of index information to be newly registered comes, the sorting order of the acquired property entry is previous to the newly added entry in the sorting order in step SP109, therefore, the system control micom 19 proceeds from step SP109 to step SP112. In the step SP107, when the variable "i" becomes "0 (zero)", the system control micom 19 proceeds from step SP107 to step SP112. The case in which the variable "i" becomes "0" is a case in which the sorting order of the newly added entry is in the most previous order.

The system control micom 19 registers index information (entry_index) to be newly registered in the (i+1)th order in the child entry list in the step SP112, then, proceeds to step SP113 to end the process procedures.

The system control micom 19 also updates the child entry list recorded in the corresponding parent entry in the same manner when the content file is deleted, or when the content is moved to the another folder.

In the embodiment, after the type of sorting (type_of_sort) has been set once, the system control micom 19 updates index information (entry index) recorded in the child entry list so that the record of the child entry list is in the set sorting order so that the record of the child entry list is in the set sorting order, in accordance with the record, deletion or alternation of the content file.

In the processing of the above FIG. 13 to FIG. 16, the case that content files are sorted and displayed in the list has been described. The system control micom 19 performs processing with respect to folders in the same manner by the instruction of user, and displays folders in the list, which belong to the folder instructed by the user in the order instructed by the user.

Also in the case of addition, deletion or movement of the folder, the system control micom 19 sorts index information of child entries and updates the child entry list in the same manner as described above.

When the change of sorting order is instructed by the user in a state in which list display according to a certain order is performed, the system control micom 19 updates the type of sorting (type_of_sort) recorded in the child entry so as to correspond to the change of sorting order, and sorts the order of index information recorded in the child entry list so as to correspond to the updated type of sorting (type_of_sort).

(4) Representative Time Information

Figure 17:
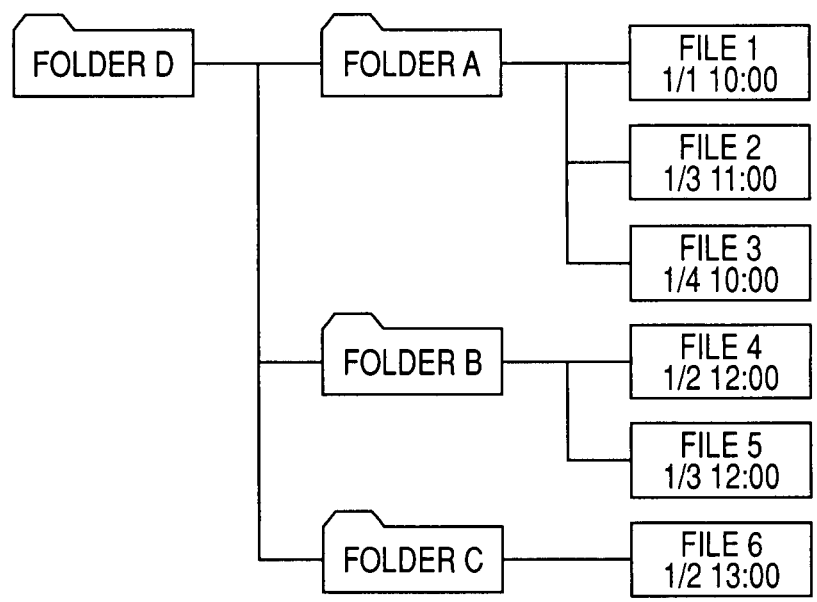
FIG. 17 is a block diagram showing an example of a hierarchical structure including folders and files.

As shown in FIG. 17, a case is considered, where content files are respectively held in three folders A to C and the three folders A to C belong to a folder D. In this case, it is considered that content files in a lower hierarchy of the folder D are sorted out by the folders A to C and displayed in a prescribed sorting order. These three folders A to C are folders, for example, which put content files acquired by taking images into categories. A case that a folder name "landscape" is allocated to the folder A, a folder name "family" is allocated to the folder B and a folder name "event" is allocated to the folder C can be considered. In FIG. 17, 1/1, 1/2, 1/3, and 1/4 shown in respective content files indicate recorded dates of content files, respectively.

Figure 18:
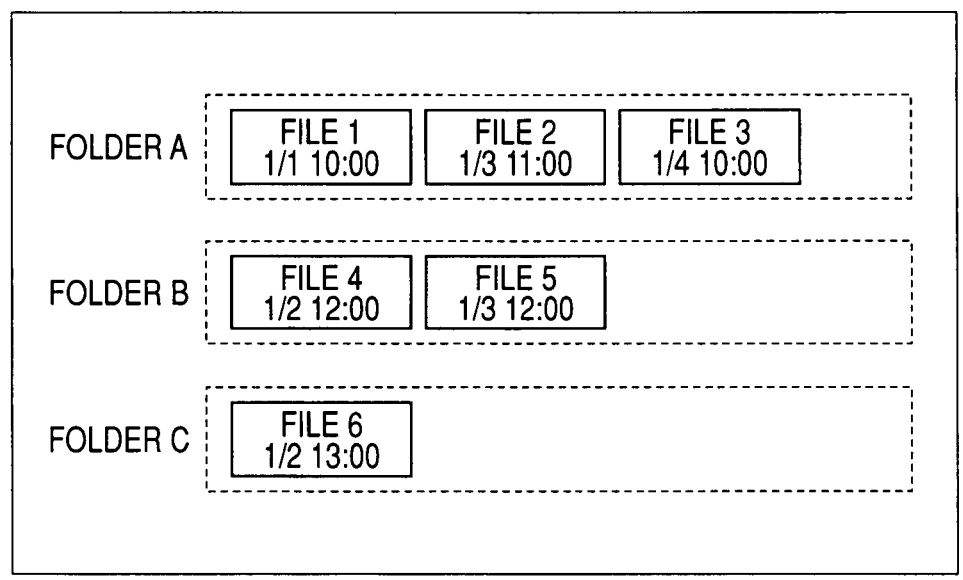
FIG. 18 is a block diagram showing a display example of content files according to the hierarchical structure in FIG. 17.

In the hierarchical structure shown in FIG. 17, a case is considered, where the content files are displayed in a list in the recorded order of content files by being sorted out by the folders A to C. In this case, as shown in FIG. 18, the folder A of the content file 1 is displayed at the head so that the content file 1 whose recorded date is the oldest in the content files 1 to 6 is displayed at the head, and content files 1 to 3 belonging to the folder A are displayed in order from oldest recoded date. Next, the folder B of the content file 4 is displayed next so that the remaining content file 4 whose recorded date is the oldest in the content files 4 to 5 is displayed at the head of the sequential folder, and content files 4 and 5 belonging to the folder B are displayed in order from oldest recorded date. The remaining folder C is displayed at the end, content files belonging to the folder C are displayed in order from oldest record.

In this case, the user can confirm content files in order from oldest to newest in a state in which they are put into categories. The user also confirms content files in a desired order in the state in which they are put into categories by folders by switching the display order to the order from oldest updated date, the order from newest recorded date or the like.

However, in the hierarchical structure shown in FIG. 17, there is a case that a content file is deleted or moved. In such case, it becomes necessary that sorting order of folders in the list display of content files (refer to FIG. 18) is switched according to the deletion or movement of the content file.

Figure 19:
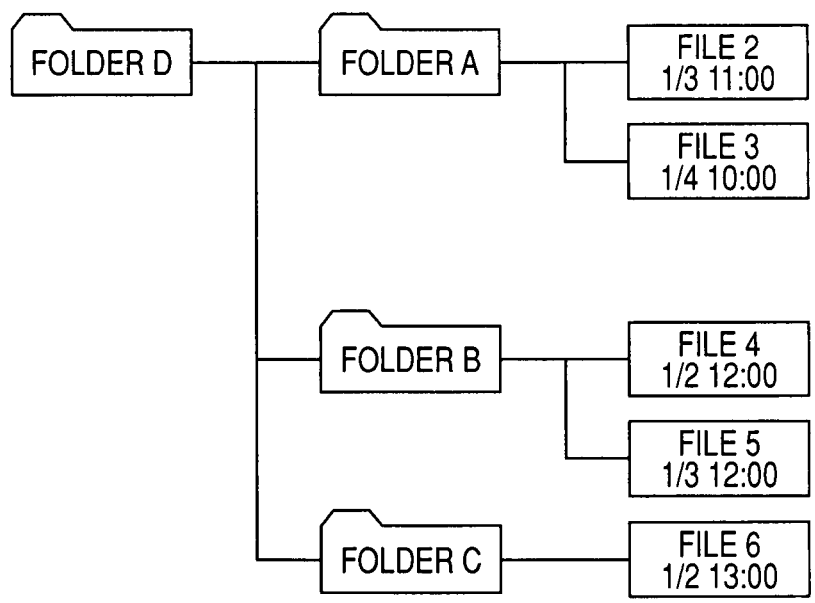
FIG. 19 is a block diagram showing an example of a hierarchical structure including folders and files.
Figure 20:
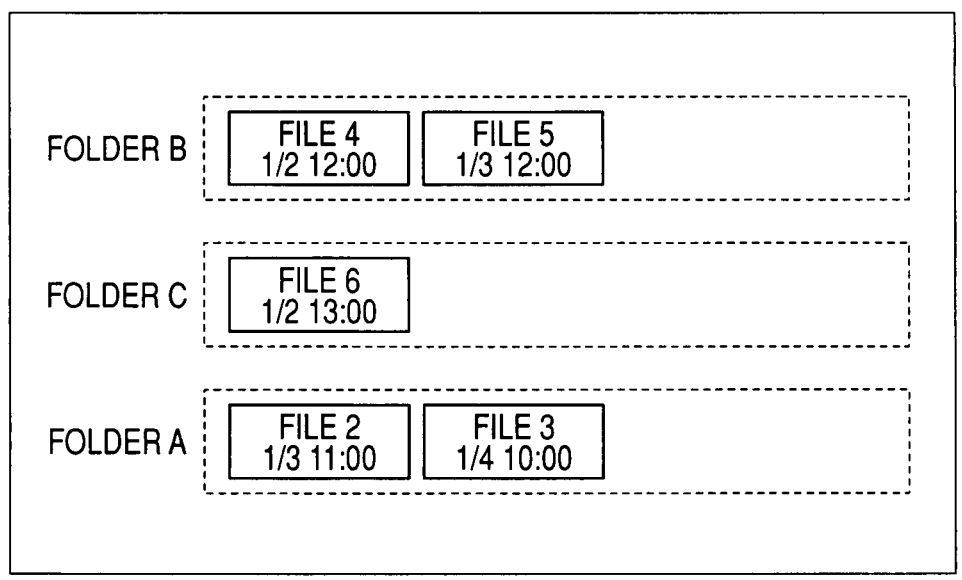
FIG. 20 is a block diagram showing a display example of content files according to the hierarchical structure in FIG. 19.
Figure 22:
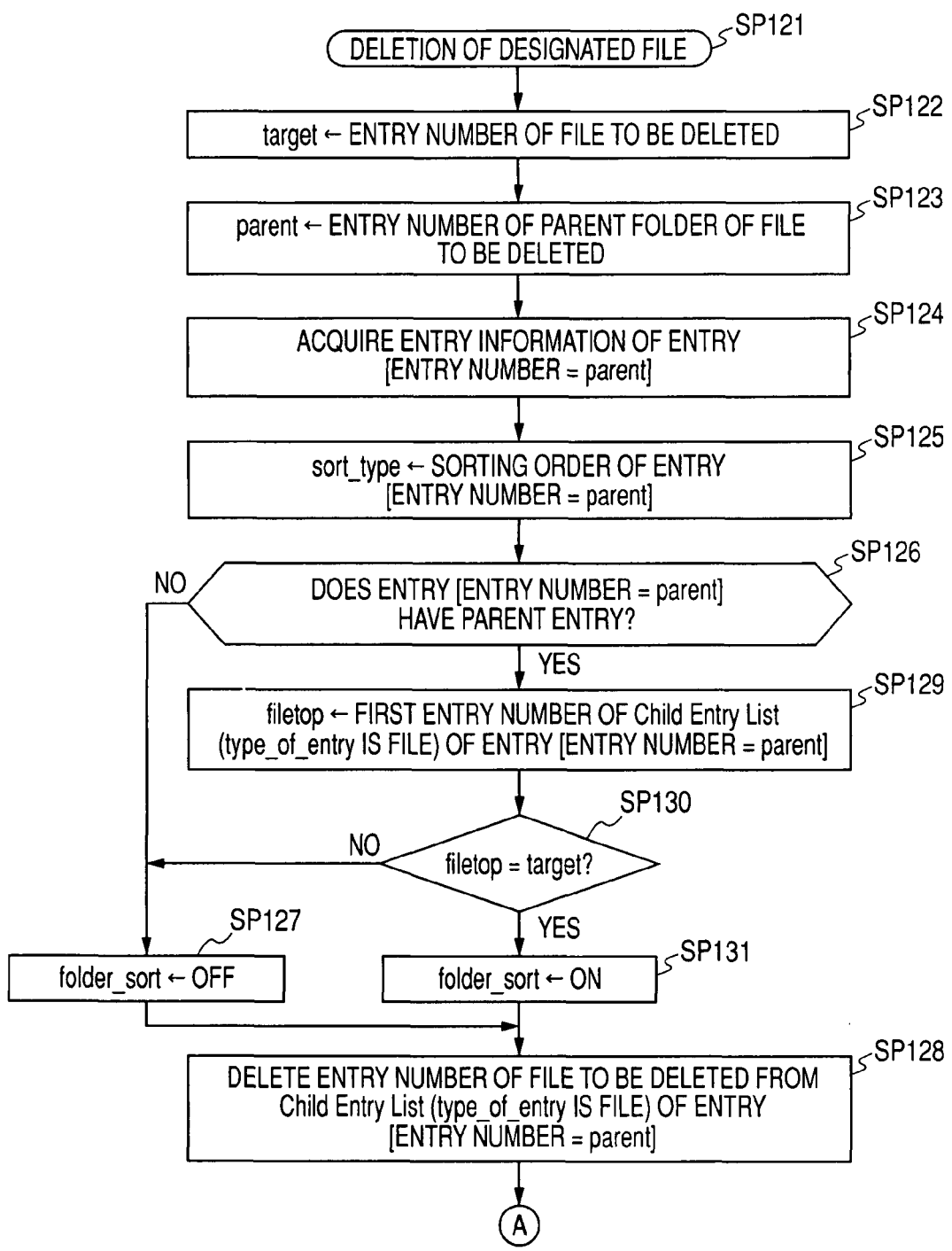
FIG. 22 is a flowchart showing processing procedures of the system control micom relating to processing of representative time information when deleting a content file.

For example, a hierarchical structure shown in FIG. 19 is considered. The hierarchical structure shown in FIG. 19 shows a case that the content file 1 is deleted in the hierarchical structure shown in FIG. 17. In this case, in the remaining content files 2 to 6, the content file 4 is the oldest file. When the hierarchical structure of FIG. 17 changes into the hierarchical structure of FIG. 19 by the deletion of the content file 1, it becomes necessary to change the display order of folders A to C so that the folder B to which the content file 4 belongs is at the head to allow the state of FIG. 18 to be a state of FIG. 20. The user can confirm content files in a desired order in the state in which they are put into categories by folders by changing the display order of folders, even when deletion, change and the like of the content files occurs. However, in this case, it is necessary to perform sorting with respect to all content files belonging to the lower hierarchy of the folder D at every display. Accordingly, when the number of content files is huge, it is difficult to ignore time required for processing of the system control micom, which leads to deterioration of user usability. In addition, it becomes difficult to perform processing in apparatuses whose resources are limited.

In the embodiment, an extension data unit (Property Extension Data Unit) by representative time information is provided in a folder entry. Time information which representing the folder in time information of content files belonging to the folder is recorded as representative time information in the extension data unit by the representative time information.

FIG. 21 shows a configuration of the extension data unit (Property Extension Data Unit) by the representative time information. In the extension data unit (Property Extension Data Unit), the size of a block size (size) is allocated at the head, next, the type of the data block (data_type (=Original Folder Time) is allocated.

Next, in the extension data unit (Property Extension Data Unit), the type of a target entry (type_of_entry) of representative time information defined in the data block is allocated. The type such as a content file or a folder is recorded in the type of the target entry (type_of_entry)

Next, in the extension data unit (Property Extension Data Unit), sorting order (type_of_sort) concerning representative time information defined in the data block is allocated. The types of sorting order such as "ascending order of generation date and time" or "descending order of generation date and time" are recorded in the sorting order (type_of_sort). Next, representative time information (time) is allocated in the extension data unit (Property Extension Data Unit).

In the extension data unit (Property Extension Data Unit) by representative time information, when content files belonging to a lower hierarchy of the folder are arranged in a sorting order defined as the sorting order (type_of_sort), time information of a content file to be the head is recorded in the field of representative time information (time) as representative time information. In the case that the sorting order (type_of_sort) is ascending order when there is not any folder and any content file in the lower hierarchy of the folder, the maximum value of available values is applied as representative time information. In addition, in the case that the sorting order (type_of_sort) is descending order when there is not any folder and any content file in the lower hierarchy of the folder, the minimum value of available values is applied as representative time information.

In this case, the maximum value of available values is, for example, a current date and time. The maximum value of available values can be also a future date and time in which a content file is not recorded in the optical disk 2, instead of the current date and time. The minimum value of available values is, for example, a date and time which is older than a recorded date and time of a content file which has been recorded first in the optical disk 2.

In the type of the target entry (type_of_entry), an identifier is set, which indicates whether the content file relating to the representative time information exists just under the folder or it exists at further lower hierarchy.

The system control micom 19, when sorting and displaying content files according to a desired order in the state in which content files are put into categories by folders, as described with reference to FIG. 17 to FIG. 20, simplifies processing relating to the display by efficiently utilizing representative time information recorded in the extension data unit (Property extension Data Unit) by the representative time information to shorten time required for the display.

Specifically, the system control micom 19 detects sequential folders in the lower hierarchy from a folder entry instructed by the user based on index information (entry_index) recorded in the child entry list, and sets the display order of the folders in the lower hierarchy according to representative time information set at the folders in the lower hierarchy. When a folder exist in a further lower hierarchy of any folder in the lower hierarchy, the system control micom 19 sets the display order in the further lower hierarchy according to representative time information set at the folder in further lower hierarchy.

The system control micom 19 sets the display order in the folders based on representative time information as described above and displays content files belonging to respective folders in the order instructed by the user.

Accordingly, the system control micom 19 updates the index file so as to correspond to respective processing of recording, deletion or movement of the content file. In this case, the system control micom 19 updates the order of index information (entry_index) recorded in the child entry list relating to the folder and the extension data unit (Property Extension Data Unit) by representative time information so as to correspond to respective processing of recording, deletion or movement of the content file.

Flowcharts of FIG. 22 to FIG. 25 show processing procedures of the system control micom 19 relating to processing of representative time information when a content file is deleted.

In the embodiment, the order of index information (entry_index) recorded in the child entry list relating to the folder and the extension data unit (Property Extension Data Unit) by representative time information in the index file are updated so as to correspond to the recording, deletion or movement of the content file, thereby allowing the sorting order (type_of_sort) recorded in the child entry list relating to the folder to correspond to the sorting order (type_of_sort) recorded in the extension data unit (Property Extension Data Unit) by representative time information.

When the deletion of a content file is instructed, the system control micom 19 deletes the content file on the file management system of the optical disk 2, then, starts processing procedures relating to processing of representative time information and proceeds from step SP121 to step SP122. In the step SP122, the system control micom 19 sets an entry number (index information (entry_index)) of an entry relating to the deleted content file as a target, and detects index information (parent_entry_index) of a parent entry recorded in the entry in the next step SP123.

In the next step SP124, the system control micom 19 acquires entry information from the parent entry, and detects the sorting order (type_of_sort) from the extension data unit (Property Extension Data Unit) by representative time information registered in the parent entry in the next step SP125.

Next, the system control micom 19 proceeds to step SP126, detects index information (parent entry index) of the parent entry from entry information of the parent entry detected in step SP124, and judges whether there is another parent entry or not.

In the case that the parent entry detected in step SP124 is the entry in the folder of the top hierarchy, there is no parent entry in step SP126, therefore, the system control micom 19 proceeds from step SP126 to step SP127. In the step SP127, the system control micom 19 sets a switch (folder_sort) to OFF, which relates to the setting of whether sorting processing relating to the folder is performed or not, after that, proceeds to step SP128. The sorting processing relating to the folder is processing of sorting the order of index information (entry_index) recorded in the child entry list relating to the folder.

When there is a parent entry in step SP126, the system control micom 19 proceeds from step SP126 to step SP129. The system control micom 19 detects index information (entry_index) of the head from the child entry list relating to the content file recorded in the parent entry in step SP124 in step SP129. The system control micom 19 also judges whether the head index information (entry_index) relates to the target set in step SP122 or not in the next step SP130.

When the head index information (entry_index) does not relates to the target set in step SP122, the system control micom 19 proceeds from step SP130 to step SP127, sets the switch (folder_sort) of sorting processing relating the folder to OFF, after that, proceed to step SP128. On the other hand, when the head index information (entry_index) relates to the target set in step SP122, the system control micom 19 proceeds from step SP130 to step SP131. The system control micom 19 sets the switch (folder_sort) of sorting processing relating the folder to ON, after that, proceeds to step SP128.

Figure 23:
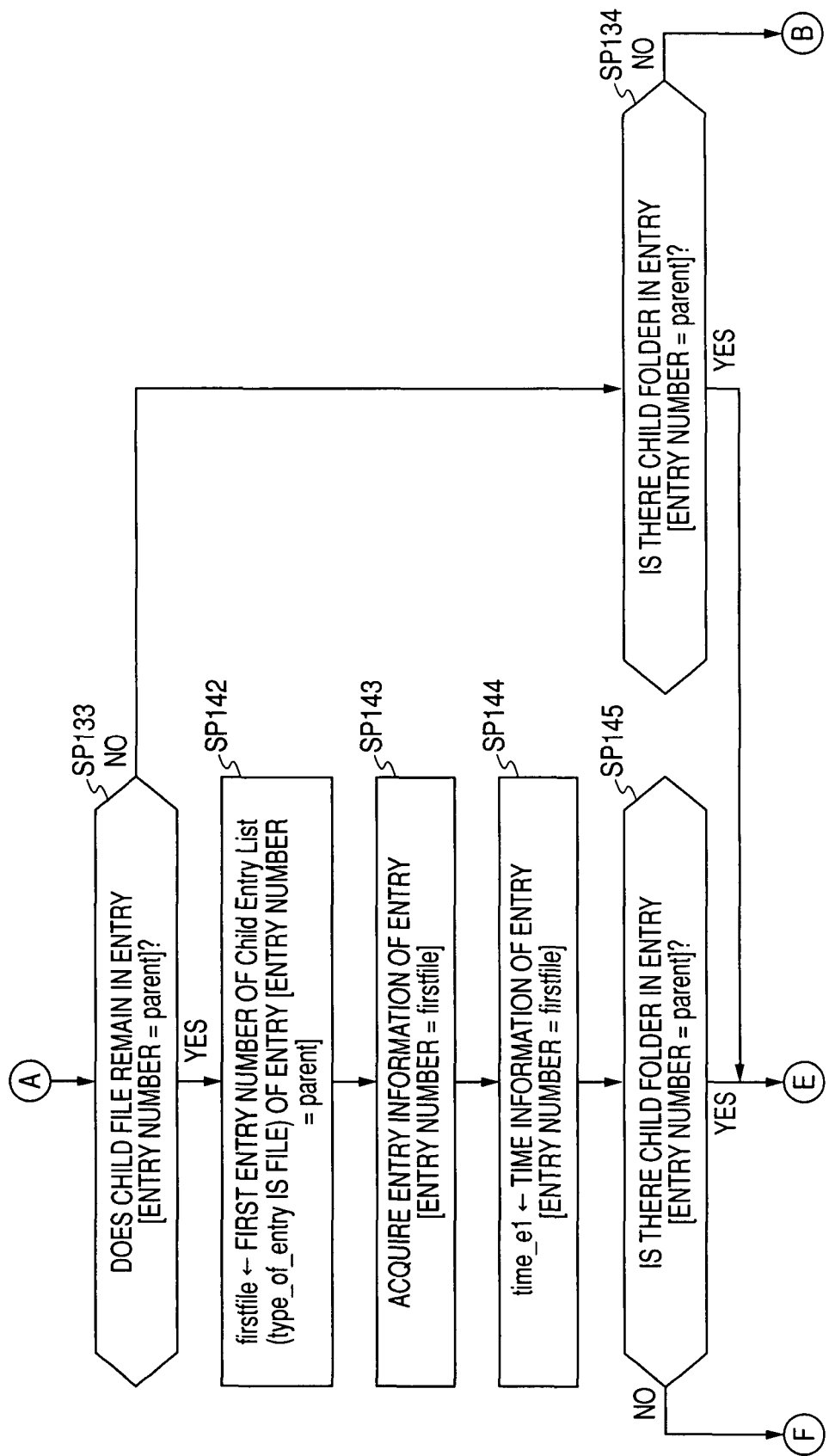
FIG. 23 is a flowchart showing processing procedures of the system control micom relating to processing of representative time information when deleting a content file.

The system control micom 19 deletes index information (entry_index) relating to the target from the child entry list recorded in the parent entry detected in step SP124 in step SP128 and proceeds to step SP133 (FIG. 23).

The system control micom 19 judges whether it is necessary to sort the order of index information (entry_index) recorded in the child entry list relating to the folder according to a series of processing from step SP126 to step SP128. That is, the system control micom 19 judges that it is necessary to sort the order of index information (entry_index) when the head index information (entry_index) relates to the target and sets the switch (folder_sort) of sorting processing relating to the folder to ON.

Figure 25:
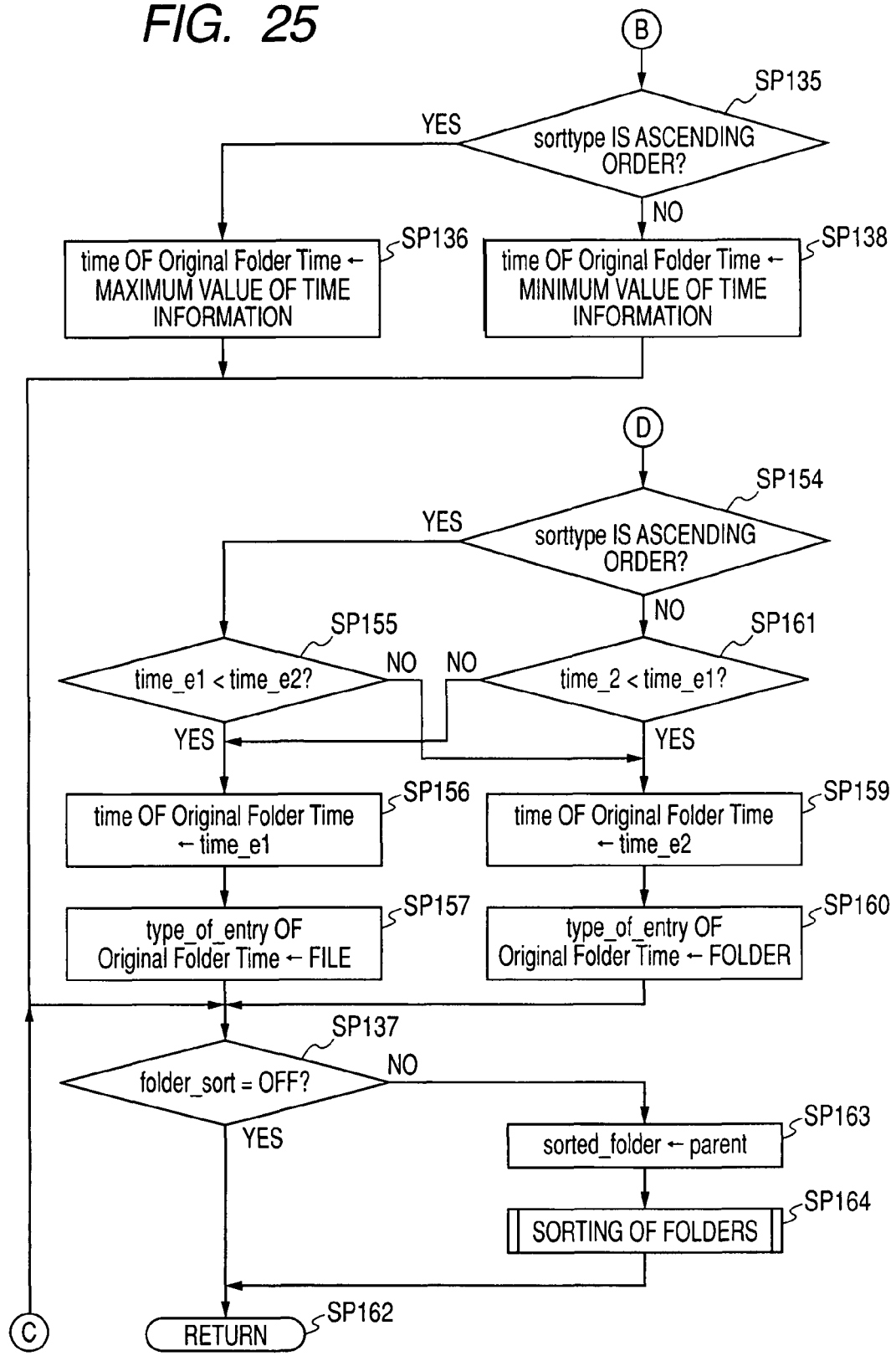
FIG. 25 is a flowchart showing processing procedures of the system control micom relating to processing of representative time information when deleting a content file.

In step SP133, the system control micom 19 judges whether a child entry relating to the content file remains or not in the parent entry detected in step SP124. When any child entry relating to the content file does not remain, the system control micom 19 proceeds from step SP133 to SP134. In step SP134, the system control micom 19 judges whether a child entry relating to the folder exist with respect to the parent entry detected in step SP124 or not. When any child entry relating to the folder does not exist, the system control micom 19 proceeds from step SP134 to step SP135 (FIG. 25).

In step SP135, the system control micom 19 judges whether the sorting order (type_of_sort) in the extension data unit (Property Extension Data Unit) relating to representative time information of the parent entry is an ascending order or not. When the sorting order (type_of_sort) is the ascending order, the system control micom 19 proceeds from step SP135 to step SP136. In step SP136, the system control micom 19 sets representative time information (time) of the extension data unit (Property Extension Data Unit) to the maximum value of available values, then, proceeds to step SP137.

When the sorting order (type of sort) is not the ascending order in step SP135, the system control micom 19 proceeds from step SP135 to step SP138. In the step SP138, the system control micom 19 sets representative time information (time) of the extension data unit (Property Extension Data Unit) to the minimum value of available values, then, proceeds to step SP137.

Figure 24:
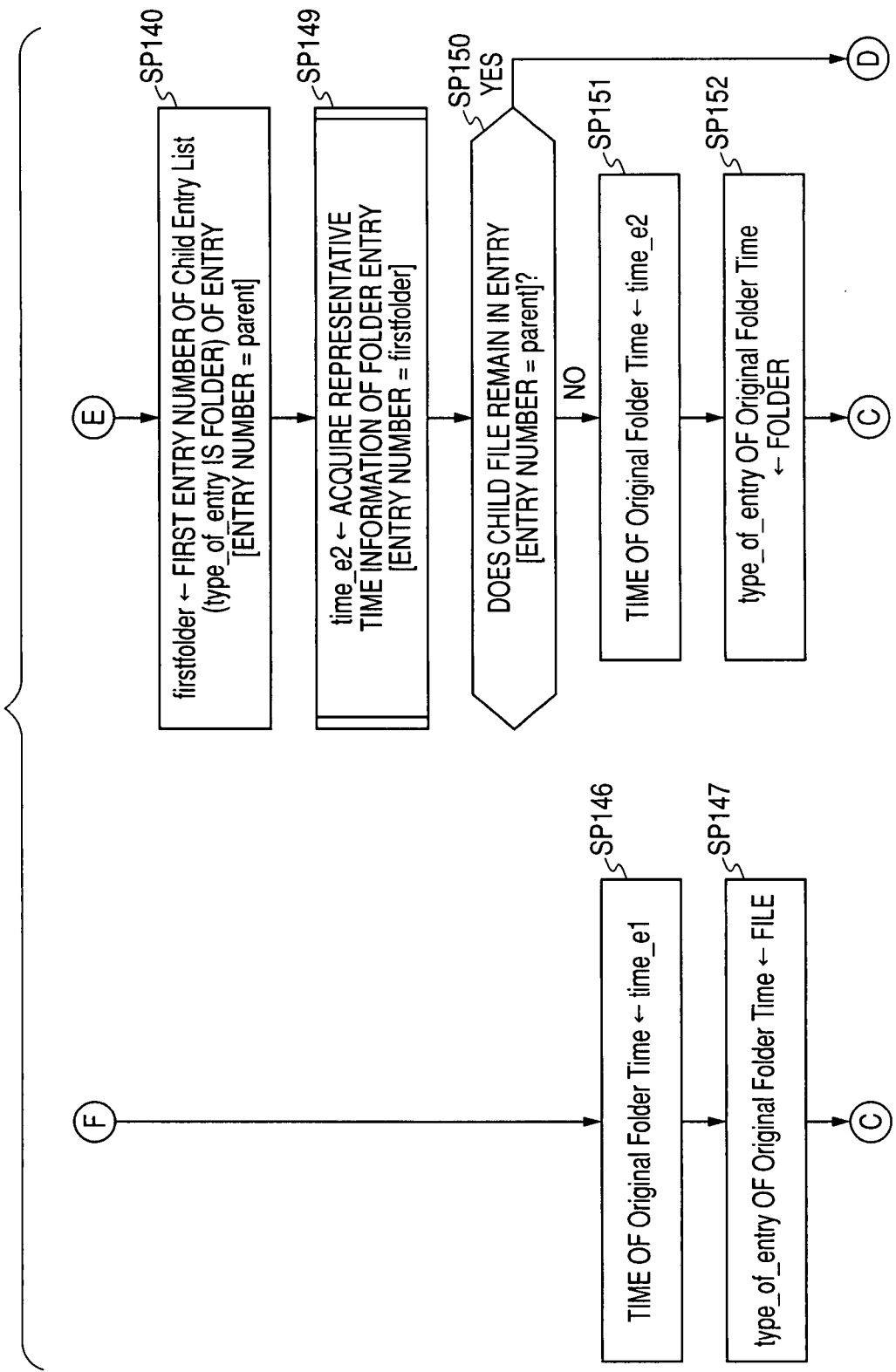
FIG. 24 is a flowchart showing processing procedures of the system control micom relating to processing of representative time information when deleting a content file.

When a child entry relating to the folder exists in the above step SP134, the system control micom 19 proceeds from step SP134 to step SP140 (FIG. 24).

In addition, when a child entry relating to the content file remains in the parent entry in the above step SP133, the system control micom 19 proceeds from step SP133 to step SP142. In step SP142, the system control micom 19 detects the head index information (entry index) from the child entry list relating to the content file recorded in the parent entry and sets the content file according to the index information (entry index) as the head content file.

In step SP143, the system control micom 19 acquires entry information of the head content file. Then, in the next step SP144, the system control micom 19 detects time information corresponding to the sorting order (type_of_sort) of the extension data unit (Property Extension Data Unit) from time information set in the entry information to set the information as a first time information (time_e1), after that, proceeds to step SP145. Time information is a generation date and time (entry_generation_time) or an update date and time (entry_modification_time) of the entry.

The system control micom 19 judges whether a child entry relating to the folder is recorded in the parent entry detected in step SP124 or not in the step SP145. When any child entry relating to the folder is not recorded, the system control micom 19 proceeds from step SP145 to step SP146 (FIG. 24). In the step SP146, the system control micom 19 sets the first time information (time_e1) set in the step SP144 in the representative time information (time) of the extension data unit (Property Extension Data Unit). The system control micom 19 sets the type of the target entry (type of entry) of the extension data unit (Property Extension Data Unit) as the file in the next step SP147, after that, proceeds to step SP137.

When a child entry relating to the folder is recorded in the above step SP145, the system control micom 19 proceeds from step SP145 to step SP140 (FIG. 24).

In the step SP140, the system control micom 19 detects the head index information (entry_index) of the child entry list relating to the folder, which is set in the parent entry. Then, in the next step SP149, the system control micom 19 detects representative time information recorded in the entry according to the head index information (entry_index), sets the information as a second time information (time_e2), then, proceeds to step SP150.

In the step SP150, the system control micom 19 judges whether a child entry relating to the content file remains or not in the parent entry detected in step SP124. When any child entry relating to the content file does not remain, the system control micom 19 proceeds from step SP150 to step SP151. In the step SP151, the system control micom 19 sets the second time information (time_e2) set in step SP140 in the representative time information (time) of the extension data unit (Property Extension Data Unit). In the next step SP152, the system control micom 19 sets the type of the target entry of the extension data unit (Property Extension Data Unit) as the folder, after that, proceeds to step SP137 (FIG. 25).

When a child entry relating to the content file remains in the above step SP150, the system control micom 19 proceeds from step SP150 to step SP154 (FIG. 25). In the step SP154, the system control micom 19 judges whether the sorting order (type_of_sort) of the extension data unit (Property Extension Data Unit) relating to respective time information of the parent entry is ascending order or not. When the sorting order (type_of_sort) is the ascending order, the system control micom 19 proceeds from step SP154 to step SP155.

In the step SP155, the system control micom 19 judges whether the first time information (time_e1) is older than the second time information (time_e2). When the first time information (time_e1) is older than the second time information (time_e2), the system control micom 19 proceeds from step SP155 to step SP156. In the step SP156, the system control micom 19 sets the first time information (time_e1) in the representative time information (time) of the extension data unit (Property Extension Data Unit). In the next step SP157, the system control micom 19 sets the type of the target entry (type_of_entry) of the extension data unit (Property Extension Data Unit) as the file, after that, proceeds to step SP137.

In the above step SP155, when the first time information (time_e1) is not older than the second time information (time_e2), the system control micom 19 proceed from step SP155 to step SP159. In the step SP159, the system control micom 19 sets the second time information (time_e2) in the representative time information (time) of the extension data unit (Property Extension Data Unit). In the next step SP160, the system control micom 19 sets the type of the target entry (type_of_entry) of the extension data unit (Property Extension Data Unit) as the folder, after that, proceeds to step SP137.

When the sorting order (type of sort) is not the ascending order in the above step SP154, the system control micom 19 proceeds from step SP154 to step SP161. In the step SP161, the system control micom 19 judges whether the first time information (time_e1) is newer than the second time information (time_e2) or not. When the first time information (time_e1) is newer than the second time information (time_e2), the system control micom 19 proceeds from step SP161 to step SP 159. When the first time information (time_e1) is not newer than the second time information (time_e2), the system control micom 19 proceeds from step SP161 to step SP156.

When the entry is deleted by the deletion of the content file according to the processing of the above respective steps, the system control micom 19 detects time information of the content file belonging just under the parent entry of the content file to be deleted and representative time information of the folder, and selects these time information based on the sorting order (type_of_sort) to update the representative time information of the parent entry.

The system control micom 19, when the representative time information is updated, judges whether the switch (folder_sort) relating to sort processing is set to OFF or not in step SP137. When the switch (folder_sort) is set to OFF, the system control micom 19 proceeds from step SP137 to step SP162 to end the processing procedures.

On the other hand, when the switch (folder_sort) is set to ON, the system control micom 19 proceeds from step SP137 to step SP163. In the step SP163, the system control micom 19 sets the parent entry as the entry to be sorted and in the next step SP164, performs sorting processing relating to the folder, after that, proceeds to step SP162 to end the processing procedures. The system control micom 19 deletes the target entry at the same time as these processing.

In the case that an entry is registered according to the record of a content file, or in the case that an entry is updated according to movement of a content file between folders, the system control micom 19 performs the same processing procedures as the above processing procedures described with reference to FIG. 22 to FIG. 25, that is, representative time information of the corresponding folder is updated, and the type of a target entry (type_of_entry) is updated so as to correspond to the update of the representative time information.

When the extension data unit (Property Extension Data Unit) relating to representative time information is not set to the parent entry, the system control micom 19 performs processing relating to the deletion by directly proceeding from step SP128 to step SP137 in the above processing procedures of FIG. 22 to FIG. 25. The extension data unit (Property Extension Data Unit) relating to respective time information is registered together when the folder entry is registered according to the previous setting by the user.

Figure 26:
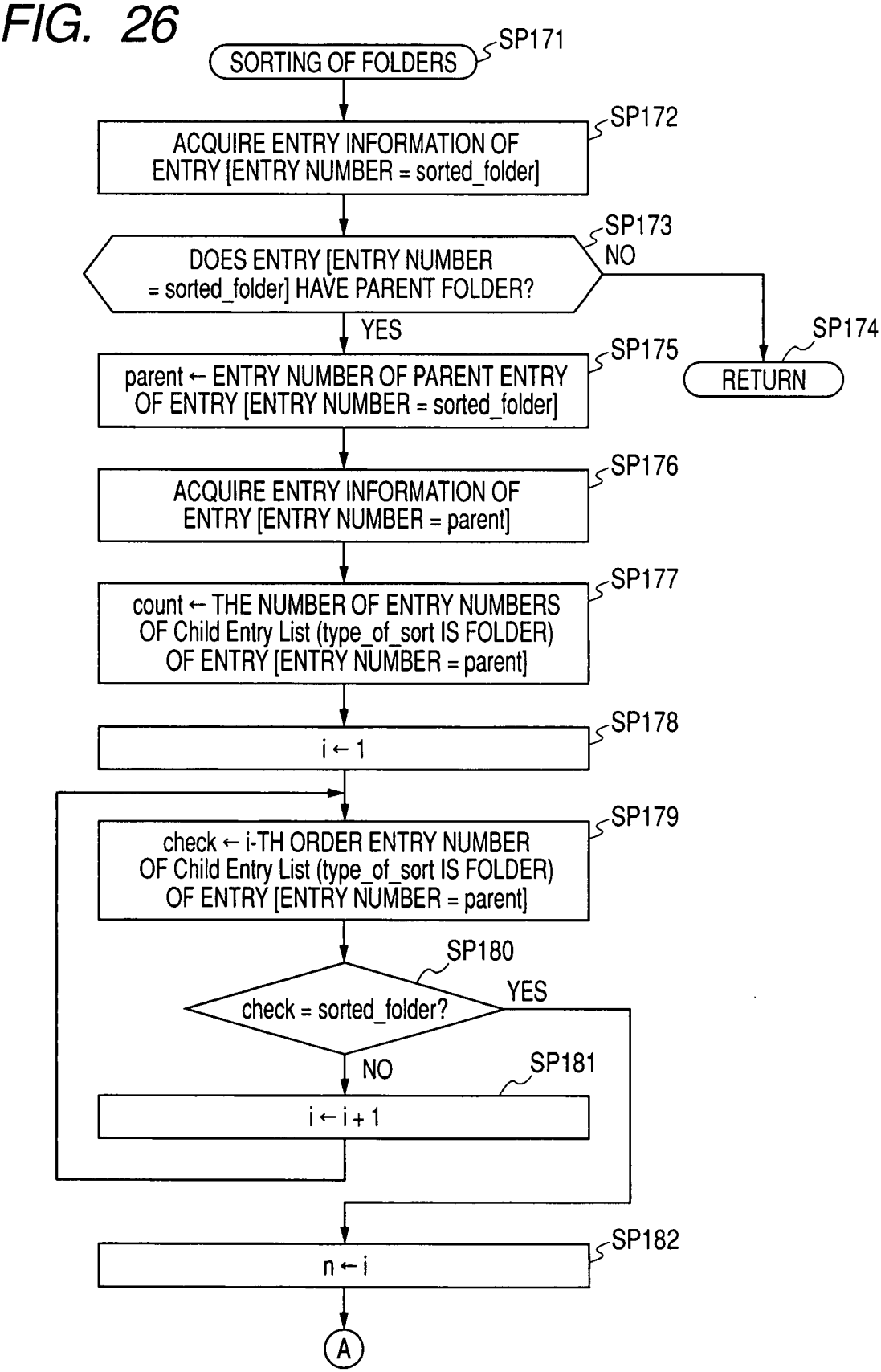
FIG. 26 is a flowchart showing processing procedures of the system control micom in sort processing.
Figure 27:
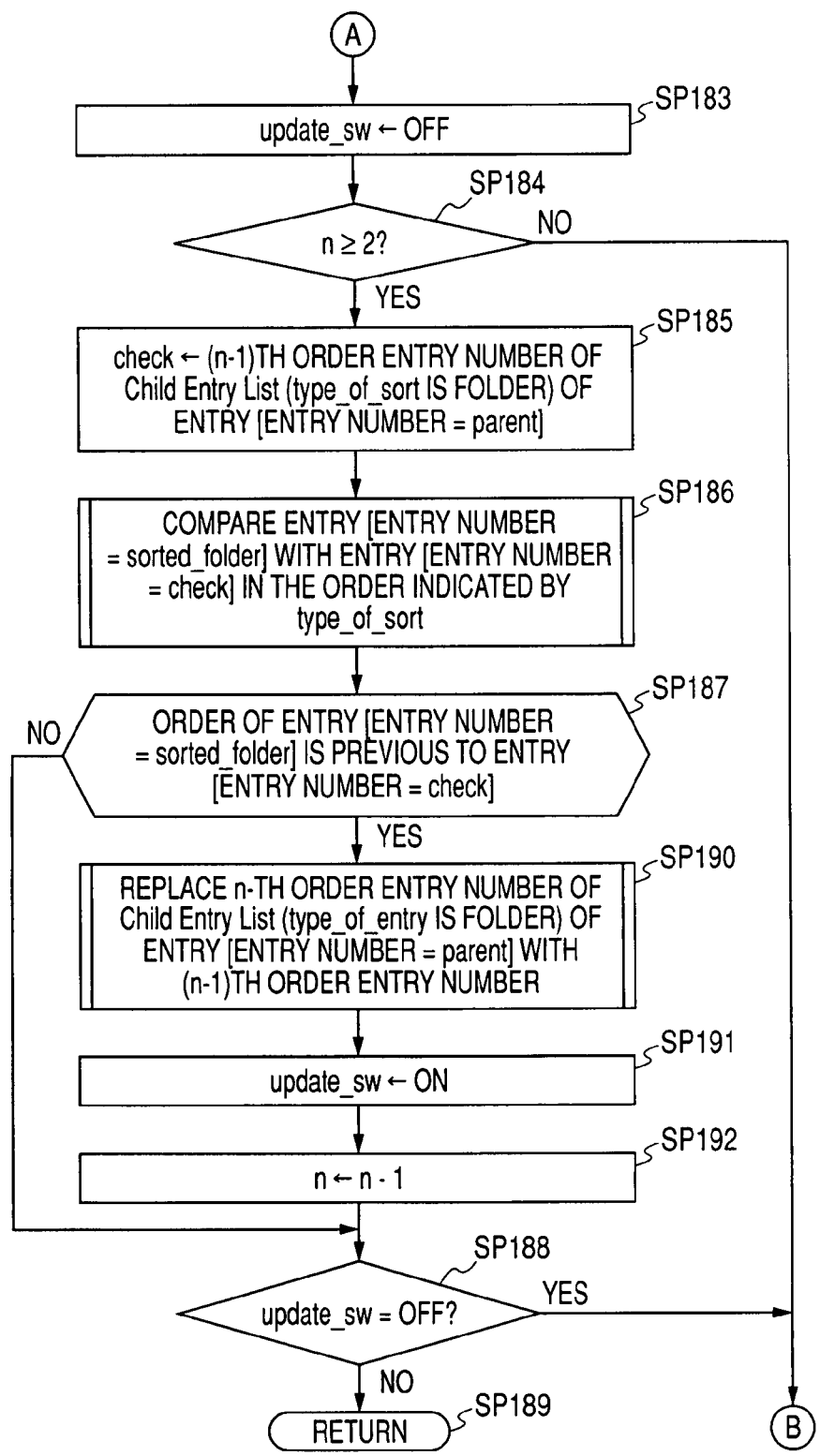
FIG. 27 is a flowchart showing processing procedures of the system control micom in sort processing.
Figure 28:
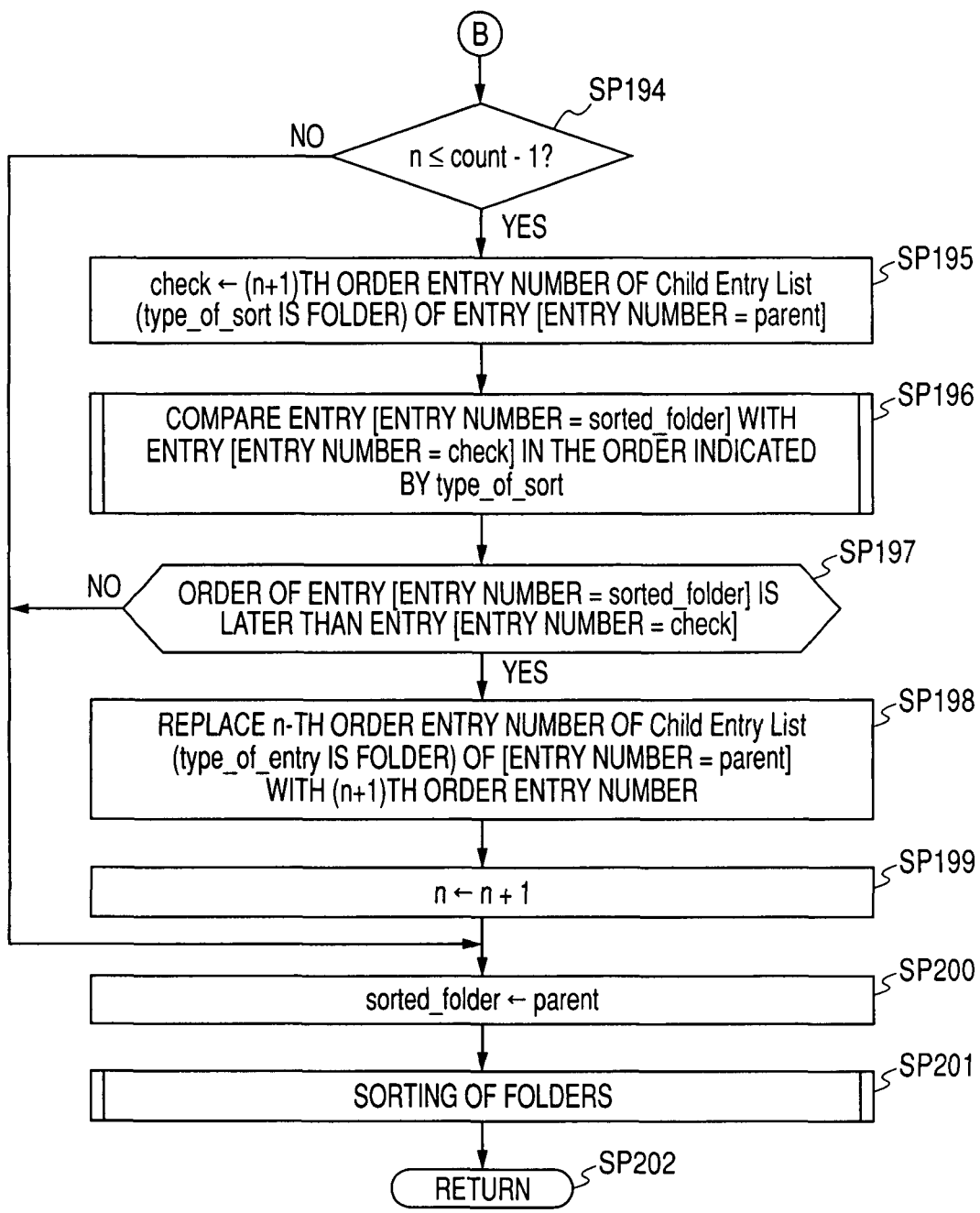
FIG. 28 is a flow chart showing processing procedures of the system control micom in sort processing.

Flowcharts of FIG. 26 to FIG. 28 show the sort processing of step SP164 in FIG. 25. The system control micom 19 performs processing procedures of the sort processing also when the index file is updated according to the record of the content file, movement of the folder and the like, in addition to processing relating to deletion of the content file.

When the processing procedures are started, the system control micom 19 proceeds from step SP171 to step SP172. In the step SP172, the system control micom 19 acquires entry information of a folder to be sorted. In the next step SP173, the system control micom 19 judges whether a parent folder exist with respect to the folder to be sorted. When any parent folder does not exist with respect to the folder to be sorted, the system control micom 19 proceeds from step SP173 to step Spl74 to end the processing procedures.

When a parent folder exists with respect to the folder to be sorted, the system control micom 19 proceeds from step SP173 to step SP175. In the step SP175, the system control micom 19 detects an entry number (index information (entry_index)) of the parent entry and acquires entry information of the parent entry in the next step SP176.

In the next step SP177, the system control micom 19 detects the number of index information (entry_index) from the child entry list relating to the folder registered at the parent entry. In the next step SP178, the system control micom 19 initializes a variable "i" to a value "1", and detects the i-th index information (entry_index) from the child entry list relating to the folder registered in the parent entry in step SP179, then, proceeds to step SP180.

In the step SP180, the system control micom 19 judges whether index information (entry_index) detected in step SP179 is index information (entry_index) relating to the folder to be sorted or not. When the detected index information (entry_index) is not index information (entry_index) relating to the folder to be sorted, the system control micom 19 proceeds from step SP180 to step SP181 and increments the variable "i" by a value "1", after that, returns to step SP179. The system control micom 19 sequentially increments the variable "i" and repeats processing procedures from step SP179 to step SP181.

When index information (entry index) detected in the above step SP181 is index information (entry index) relating to the folder to be sorted, the system control micom 19 proceeds from step SP180 to step SP182 and substitutes a value of the valuable "i" for a variable "n". The system control micom 19 detects that the index information (entry_index) to be sorted is recorded in what number in the child entry list set in the parent entry by the processing from step SP179 to step 181.

Next, the system control micom 19 proceeds to step SP183 (FIG. 27). In the step SP183, the system control micom 19 sets a switch (update_sw) indicating update processing to an off-state, after that, proceeds to step SP184. In the step SP184, the system control micom 19 judges whether a value of the variable "n" set in step SP182 is 2 or more, namely, the folder to be sorted is not the head folder in the child entry list in the parent entry.

When the value of the variable "n" is 2 or more, the system control micom 19 proceeds from step SP184 to step SP185 and detects index information (entry_index) recorded in the (n−1)th order in the child entry list set in the parent entry detected in step SP175. In the next step SP186, the system control micom 19 sequentially compares entry information of the entry to be sorted with entry information (entry_index) detected in step SP185 according to the sorting order (type_of_sort).

Figure 29:
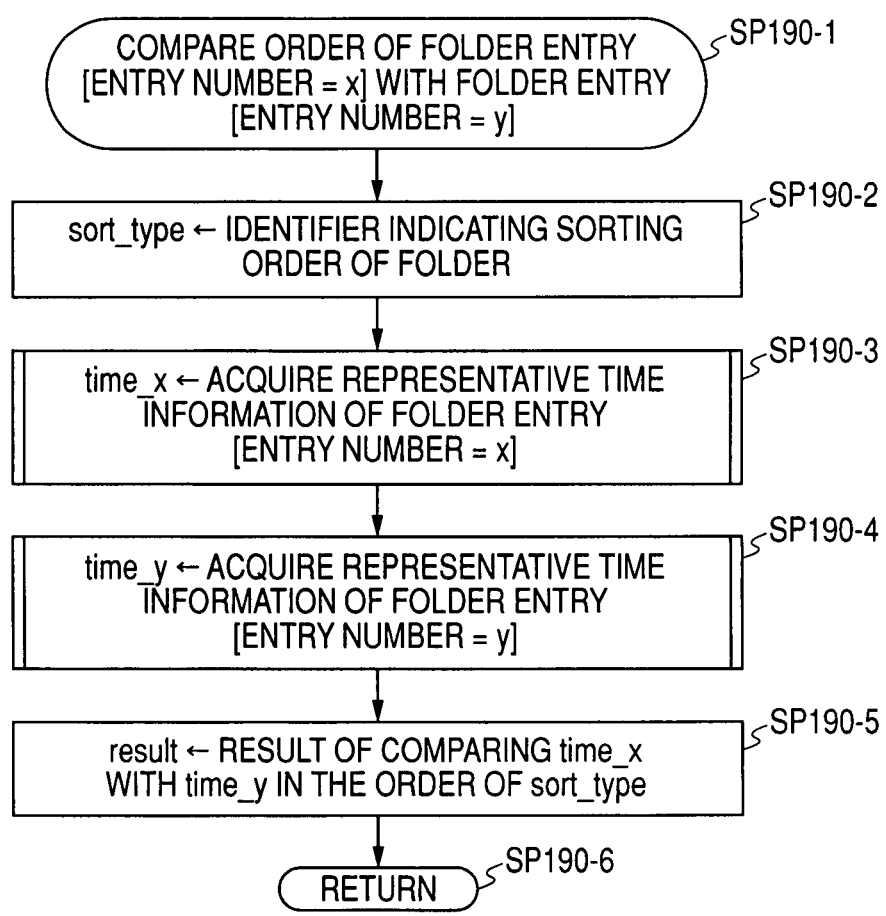
FIG. 29 is a flowchart showing processing procedures of the system control micom in comparison processing in the sort processing.

In the comparison processing, the system control micom 19 proceeds from step SP190-1 to step SP190-2 shown in FIG. 29.

In the step SP190-2, the system control micom 19 detects the sorting order (type of sort) recorded in the child entry list, and acquires representative time information recorded in one entry information to be compared in the next step SP190-3. In the next step SP190-4, the system control micom 19 acquires representative time information recorded in the other entry information to be compared. Then, the system control micom 19 compares representative time information acquired in step SP190-3 with representative time information acquired in step SP190-4 to acquire the compared result, and returns to the start of the processing procedures by step SP190-6.

Next, in step SP187, the system control micom 19 judges whether the sorting order of the entry to be sorted is previous to the entry according to index information (entry_index) detected in step SP185 or not based on the compared result acquired in step SP186. The sorting order of the entry to be sorted is not previous to the entry according to the detected entry according to index information (entry_index), it is not necessary to performing sorting, therefore, the system control micom 19 proceeds from step SP187 to step SP188.

In the step SP188, the system control micom 19 judges whether a switch for update (update_sw) is set to OFF or not. When the update switch (update_sw) is set to ON, the system control micom 19 proceeds from step SP188 to step SP189 to end the processing procedures.

In the above step SP187, the sorting order of the entry to be sorted is previous to the detected entry according to the index information (entry index), the system control micom 19 proceeds from step SP187 to step SP190. In the step SP190, the system control micom 19 replaces the n-th index information (entry_index) with the (n−1) th index information (entry_index), and sets the switch of update (update_sw) to the on state in the next step SP191. In step SP192, the system control micom 19 decrements the variable "n" by a value "1", after that, proceeds to step SP188.

In the step SP188, when the update switch is set to OFF, the system control micom 19 proceeds from step SP188 to step SP194 (FIG. 28). Also when the value of the variable "n" is not 2 or more in the above step SP184, the system control micom 19 proceeds to step SP194.

In the step SP194, the system control micom 19 judges whether the value of variable "n" is equal to or less than a value obtained by subtracting a value "1" from the number of index information (entry_index) detected in step SP177 or not, namely, judges whether further another folder to be compared exists in the child entry list or not. When the value of the variable "n" is equal to or less than the value obtained by subtracting a value "1" from the number of index information, the system control micom 19 proceeds from step SP194 to step SP195.

The system control micom 19 acquires (n+1)th index information (entry_index) from the child entry list in the step SP195, and compares the sorting order between an entry of the folder according to the (n+1) th index information and the entry to be sorted in the same manner as described in FIG. 29. Then, in the next step SP197, the system control micom 19 judges whether the sorting order of the entry to be sorted is later than the sorting order of the entry according to index information (entry_index) detected in the step SP195 or not.

When the sorting order of the entry to be sorted is later than the sorting order of the entry according to the detected index information, the system control micom 19 proceeds from step SP197 to step SP198. In the step SP198, the system control micom 19 replaces the n-th index information (entry_index) with the (n+1)th index information (entry_index) registered in the child entry list, increments the variable "n" by a value "1" in the next step SP199 and proceeds to step SP200.

In the step SP194, when the value of the variable "n" is not equal to or less than the value obtained by subtracting the value "1" from the number of index information, further, in the step SP197, when the sorting order of the entry to be sorted is not later than the sorting order of the entry according to the detected index information (entry index), the system control micom 19 proceeds to step SP200.

In the step SP200, the system control micom 19 changes setting of the parent entry until then to be the entry to be sorted, after that, repeats anew the sorting processing relating to the above FIG. 26 to FIG. 28 in the next step SP201, and ends the processing procedures in the next step SP202.

With respect to the folder in which representative time information is changed according to the deletion of the content file and so on, the system control micom 19 detects the entry relating to the folder, which has been previous or later in the sorting order from the child entry list recorded in the entry relating to the folder in the upper hierarchy, updates the child entry list recorded in the entry relating to the folder in the upper hierarchy by the comparison with representative time information recorded in the entry, then, updates the sorting order of the child entry list relating to the folder so as to correspond to deletion of the content file and the like.

Figure 30:
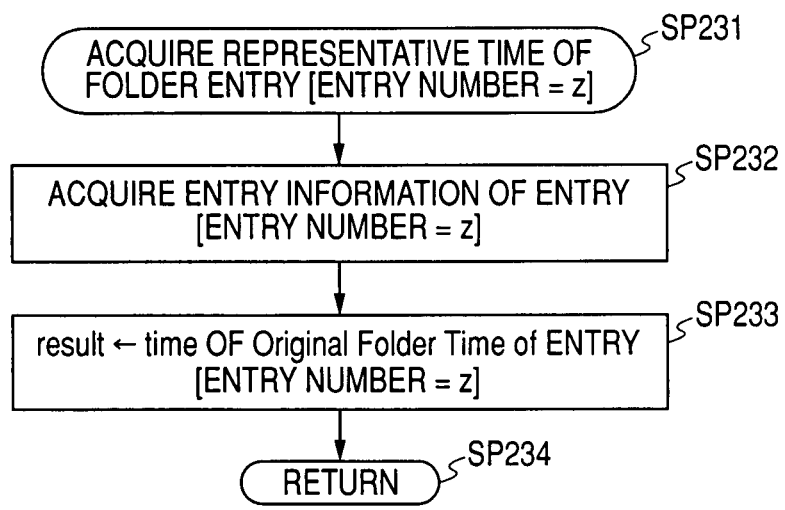
FIG. 30 is a flowchart showing processing procedures of the system control micom in acquiring processing of representative time information in the sort processing.

A flowchart of FIG. 30 shows the processing of acquiring representative time information relating to the processing procedures of step SP190-3 and step SP190-4 in FIG. 29. In this case, the system control micom 19 proceeds from step SP231 to step SP232 and acquires entry information of a target entry. In the next step SP233, the system control micom 19 detects representative time information (time) from the extension data unit (Property Extension Data Unit) relating to representative time information of the entry information, after that, proceeds to step SP234 to return to the start of the processing procedures.

Figure 31:
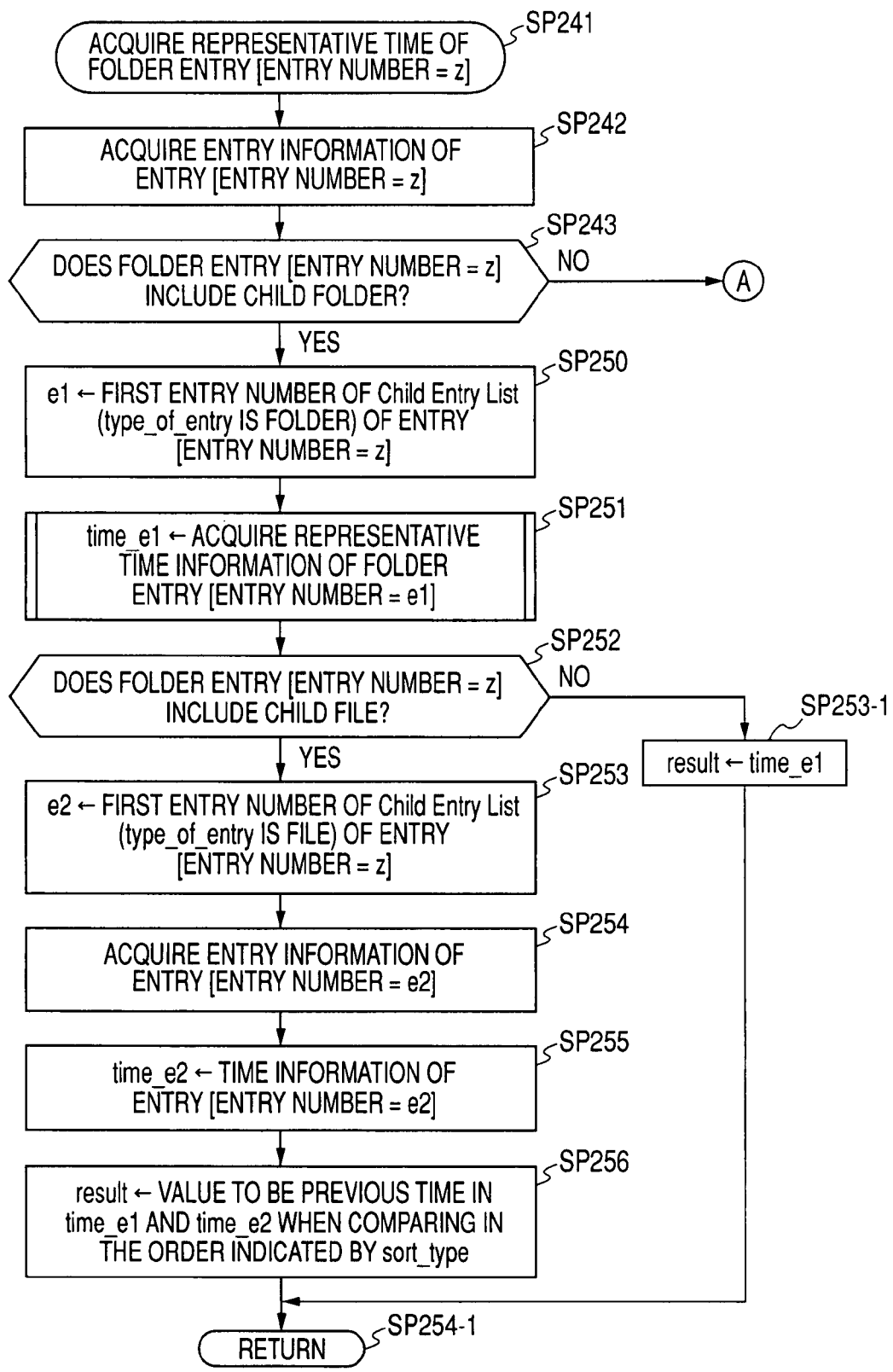
FIG. 31 is a flowchart showing processing procedures of the system control micom which acquires representative time information when an extension data unit relating to representative time information is not set.
Figure 32:
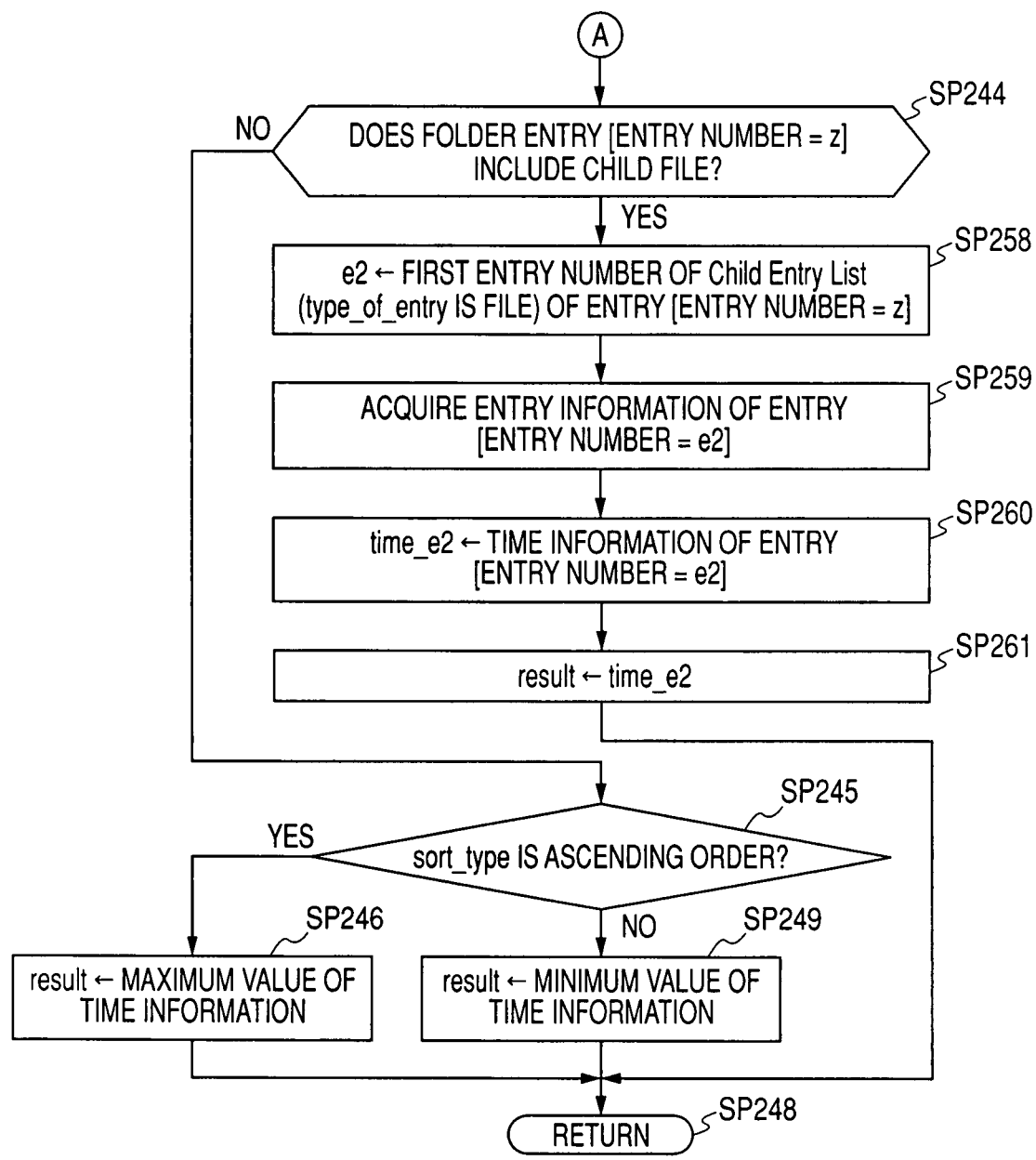
FIG. 32 is a flowchart showing processing procedures of the system control micom which acquires representative time information when an extension data unit relating to representative time information is not set.

Flowcharts of FIG. 31 and FIG. 32 show processing procedures of the system control micom 19 which acquires representative time information when the extension data unit (Property Extension Data Unit) relating to representative time information is not set.

The system control micom 19 proceeds from step SP241 to step SP242 and acquires entry information of a target entry. In the next step SP243, the system control micom 19 judges whether a child entry relating to a folder exists with respect to the target entry or not based on the acquired entry information. When any child entry does not exist with respect to the target entry relating to the folder, the system control micom 19 proceeds from step SP243 to step SP244 (FIG. 32).

In the step SP244, the system control micom 19 judges whether there is a child entry relating to the content file in the target file or not. When there is not any child entry relating to the content file with respect to the target entry, the system control micom 19 proceeds from step SP244 to step SP245 and judges whether the sorting order (sort_type) is an ascending order or not. When the sorting order is the ascending order, the system control micom 19 proceeds from step SP245 to step SP246. In the step SP246, the system control micom 19 detects representative time information from the maximum value of available values, after that, proceeds to step SP248 to end the processing procedures.

In step SP245, when the sorting order (sort_type) is not the ascending order, the system control micom 19 proceeds from step SP245 to step SP249. In the step SP249, the system control micom 19 detects representative time information from the minimum value of available values, after that, proceeds to step SP248 to end the processing procedures.

In the step SP243, when a child entry relating to a folder exists with respect to the target entry, the system control micom 19 proceeds from step SP243 to step SP250. In the step SP250, the system control micom 19 detects the i-th index information (entry_index) from a child entry list relating to the folder.

In the next step SP251, the system control micom 19 detects representative time information from the folder entry according to the i-th index information (entry_index) and sets the representative time information as a first time information (e1). In the next step SP252, the system control micom 19 judges whether a child entry relating to the content file exists with respect to the target entry or not. When there is not any child entry relating to the content file with respect to the target entry, the system control micom 19 proceeds from step SP252 to step SP253-1. In the step SP253-1, the system control micom 19 detects representative time information according to the first time information (e1) set in the step SP251, after that, proceeds to step SP254-1 to end the processing procedures.

In the step SP252, when there is the child entry relating to the content file in the target entry, the system control micom 19 proceeds from step SP252 to step SP253. In the step SP253, the system control micom SP253 detects index information (entry_index) of the head entry from a child entry list relating to the content file, and acquires entry information of the entry according to the index information (entry_index) in the next step SP254. In the next step SP255, the system control micom 19 sets date and time information set in the entry information (generation date and time (entry_generation_time) of the entry and update date and time (entry_modification_time) of the entry) as a second time information (e2). Then, in the next step SP256, the system control micom 19 compares the first time information (e1) with the second time information (e2) according to the sorting order, detects representative time information by detecting time information whose sorting order is previous, after that, proceeds to step SP254-1 to end the processing procedures.

In the above step SP244, when a child entry relating to the content file exist in the target entry, the system control micom 19 proceeds from step SP244 to step SP258. In the step SP258, the system control micom 19 detects index information (entry_index) of the head entry from the child entry list relating to the content file and acquires entry information of the entry according to the index information (entry_index) in the next step SP259.

In the next step SP260, the system control micom 19 sets date and time information set in the entry as the second time information (e2), detects representative time information according to the second time information (e2) in the next step SP261, after that, proceeds to step SP248 to end the processing procedures.

In the above series of processing of detecting the representative time information, when the system control micom 19 detects representative time information of the folder entry in step SP251, in the case that an extension data unit (Property Extension Data Unit) relating to representative time information is not set, the processing of the FIG. 31 and FIG. 32 is performed also for acquiring the representative time information. In short, the system control micom 19 detects time information by searching entries relating to all content files existing in the lower hierarchy of the folder whose representative time is acquired.

In the embodiment, according to the setting of the extension data unit (Property Extension Data Unit) relating to representative time information, the system control micom 19 is capable of detecting representative time of the desired folder without searching entries relating to the all content files existing in the lower hierarchy. As a result, the system control micom 19 is capable of executing update processing of the child entry list relating to the folder easily and rapidly so as to correspond to deletion, recording or change of the content file.

The system control micom 19 performs update of the child entry list relating to the folder also according to deletion, recording or change of the folder. Even in this case, the update processing can be performed easily and rapidly.

(5) Management Information Relating to a Time Zone

Content files A and B are sequentially recorded at areas having different time zones, a case occurs, where the order of time information of corresponding entries in the index file will be opposite order to the order at the time of recording depending on the area. In this case, it can be considered that it is difficult for the user to detect a desired content file according to the index file. It is desirable to perform display according to the recording order also in this case.

In the embodiment, management information relating to the time zone is recorded in the property file FP included in the index file. In this case, management information relating to the time zone includes standard management information and individual management information, and the standard management information is recorded in the header of the property file FP.

FIG. 33 shows a configuration of the standard management information. In the standard management information, the size (size) is allocated at the head, and the type of a data block (data_type (=Default Time Zone Offset)) is sequentially allocated. In the standard management information, time information (time_zone_offset) relating to the time zone is sequentially allocated. In the time information (time_zone_offset) relating to the time zone, an offset value from UTC (Coordinated Universal Time) which is one of world standard time of time information recorded in a property entry is recorded.

The individual management information is registered in a corresponding property entry by an extension data unit (Property Extension Data Unit). FIG. 34 shows a configuration of the individual management information. In the individual management information, the size (size) is allocated at the head, and the type of a data block (data_type (=Time Zone Offset)) is sequentially allocated. In the individual management information, time information (time_zone_offset) relating to the time zone is sequentially allocated. In the time information (time_zone_offset) relating to the time zone, an offset value from UTC of time information recorded in a corresponding property entry is recorded. The individual management information is provided when the offset value from UTC of time information recorded in the property entry is different from the offset value set in the standard management information.

The system control micom 19 performs registration processing of index information (entry_index) in the child entry list, setting processing of representative time information and the like based on the management information relating to the time zone, and provides the content file to the user according to the recording order and the like even when the time zone is different.

Additionally, when the offset time of time information of each entry is different from the offset time of the standard management information, it is preferable that a value of the difference is registered in each entry as offset time by the individual management information, instead of the above setting of individual management information relating the time zone. It is also preferable that time information of each entry is registered by UTC and an offset value between the time information and time on the scene at the time of taking images is registered in each entry separately. The system control micom 19 performs the above respective processing by correcting update date and time and the like recorded in each entry according to the standard management information and the individual management information.

According to the above embodiment, index information indicating entries in the lower hierarchy is provided at the corresponding entry in the upper hierarchy in a list format, thereby performing processing relating to change of the hierarchical structure and the like managed by the index file easily and rapidly.

Also according to the above embodiment, entries of the index file are played by utilizing the list of index information indicating entries in the lower hierarchy, thereby simplifying processing relating to switching of display and the like.

Also according to the above embodiment, index information indicating entries in the lower hierarchy is provided at each folder or each content file. Various processing relating to the content file or the folder can be performed by selecting the list when necessary, thereby performing these processing easily and rapidly.

Also according to the above embodiment, the index file is updated so as to correspond to deletion of the folder, and in the update, entries required for the update are detected according to a child entry list and index information of a parent entry to update the record, thereby performing processing of the index file relating to the deletion easily and rapidly.

Also according to the above embodiment, information of the sorting order indicating the sorting order of index information is set in the child entry list, and index information of child entries are sequentially provided according to the sorting order based on the information of the sorting order. The processing when providing the contents of entries according to a desired order to the user can be performed easily and rapidly by efficiently utilizing the sorting order.

Also according to the above embodiment, the index file is updated so as to correspond to the recording or deletion of the content file recorded in a recording medium, when index information of child entries are sorted and updated according to information of the sorting order indicating the sorting order of index information, as a result, the processing when providing the contents of entries according to a desired order to the user can be performed easily and rapidly.

Also according to the above embodiment, information of the sorting order is updated by change of the order to be provided by the user as well as the sorting order of index information is changed, thereby providing the contents of entries to the user easily and rapidly.

Also according to the above embodiment, time information representing the folder is allocated in time information of the entry of the folder, thereby simplifying maintenance processing for securing display according to the sorting order and the like even at the time of addition or deletion of a file. That is, when the index file is updated so as to correspond to the change of the content file or the folder recorded in an optical disk, time information of the entries in the upper hierarchy are updated so as to correspond to the change of the content file or the folder, thereby securing the display and the like according to the sorting order even at the time of addition, deletion and so on of a file.

Also according to the above embodiment, the time information is allocated based on the world standard time, thereby displaying content files in a list in correct order, which have been recorded in different time zones.

Also according to the above embodiment, in addition to representative time information which represents the folder, information of the type of the sorting order relating to the representative time information is recorded, and further, information of identifying whether the representative time information relates to a folder or a content file is recorded. The representative time information is efficiently utilizing for various processing, thereby shortening time required for the processing.

In the above embodiment, a case that the index file is generated by a property file FP, a thumbnail file FTH, and a text file FTX has been described, however, the invention is not limited to this and can be broadly applied to a case, for example, where the index file is generated by a file according to audio data in addition to these files.

In the above embodiment, a case that the index file is generated by three separate files of the property file FP, the thumbnail file FTH, and the text file FTX has been described, however, the invention is not limited to this, and can be broadly applied to a case, for example, where the index file is generated by unifying these files.

In the above embodiment, a case that the optical disk is used as the recording medium has been described, however, the invention is not limited to this and can be broadly applied to cases where various recording media such as a hard disk or a memory card are used.

INDUSTRIAL APPLICABILITY

The invention is capable of performing processing relating to change or the like of the hierarchical structure managed by the index file easily and rapidly and can be applied to, for example, a camcorder, a digital still camera and the like.

The invention claimed is:

1. A file processing apparatus for recording, in a recording medium, an index file which manages one or more content files recorded in the recording medium, the apparatus comprising:

an index file generation unit generating the index file based on attribute information of the content files and attribute information of folders including the content files, the index file generated in the index file generation unit being recorded in the recording medium, wherein the content files and the folders form a hierarchy in which the folders are higher in the hierarchy than the content files; and wherein for each of the content files and the folders managed by the index file, if one or more of the content files and the folders are positioned next lower in the hierarchy than that content file or folder, the index file generation unit provides (i) a first management information area corresponding to that content file or folder, and (ii) second index information indicating second management information areas corresponding to the folders or the content files positioned next lower in the hierarchy, the second index information being arranged in a list format and being stored at the first management information area corresponding to that folder or content file, and if one of the content files and the folders is positioned next higher in the hierarchy than that content file or folder, the index file generation unit provides (i) the second management information area corresponding to that content file or folder, and (ii) first index information indicating the first management information area corresponding to the folder or the content file positioned next higher in the hierarchy, the first index information being stored at the second management information area corresponding to that folder or content file.

2. The file processing apparatus according to claim 1, wherein the index file generation unit provides a second index information list in the first management information area corresponding to each folder or each content file.

3. The file processing apparatus according to claim 1, wherein the index file generation unit sets sorting order information of second index information in a second index information list provided in the first management information area corresponding to a given one of the content files and folders, and sequentially provides the second index information based on the sorting order information.

4. The file processing apparatus according to claim 1, wherein the index file generation unit, when a prescribed content file is added in the hierarchy, or a prescribed content file is deleted from the hierarchy, updates the index file to correspond to the added or deleted prescribed content file, updates index information recorded in a second index information list to correspond to addition or deletion of the prescribed content file in the update of the index file and sorting the index information provided in the second index information list according to sorting order information indicating the sorting order in the update of the index information.

5. The file processing apparatus according to claim 1, wherein sorting order information of index information is provided in a second index information list, wherein an information presenting unit is further included, which plays the first and second management information areas according to the sorting order of the index information set in the second index information list to be provided to the user, and wherein the index file generation unit updates the sorting order information and changes the sorting order of the second index information to correspond to the change of presenting order in the information presenting unit.

6. The file processing apparatus according to claim 1, wherein the index file generation unit allocates time information of the content files at the first and second management information areas corresponding to the content files, and allocates time information representing a folder from time information set at the second management information areas corresponding to the content files belonging to the folder or the first management information area corresponding to the folder, as time information of the first and second management information areas corresponding to the folder.

7. The file processing apparatus according to claim 6, wherein the index file generation unit updates the index file to correspond to change of the content file or the folder in the hierarchy, and updates time information of the first management information area corresponding to the folder next higher in the hierarchy relating to change to correspond to the change of the content file or the folder in the update of the index file.

8. The file processing apparatus according to claim 6, wherein the index file generation unit allocates time information of the content files at the second management information areas corresponding to the content files based on a world standard time.

9. The file processing apparatus according to claim 6, wherein the index file generation unit allocates time information representing a folder and information of a type of the sorting order relating to the time information as time information of the first management information area of the folder.

10. The file processing apparatus according to claim 6, wherein the index file generation unit allocates time information representing a folder and information of identifying whether the time information representing the folder is according to the folder or according to the content file as time information of the first management information area of the folder.

11. A file processing apparatus for recording, in a recording medium, an index file which manages one or more content files recorded in the recording medium, the apparatus comprising:
an index file generation unit generating the index file based on attribute information of the content files and attribute information of folders including the content files, the index file generated in the index file generation unit being recorded in the recording medium,
wherein the content files and the folders form a hierarchy in which the folders are higher in the hierarchy than the content files; and
wherein for each of the content files and the folders managed by the index file, the index generation unit provides a first management information area corresponding to that content file or folder, second index information indicating second management information areas corresponding to the folders or the content files positioned next lower in the hierarchy and arranged in a list format and stored at the first management information area corresponding to that folder or content file, and first index information indicating the first management information area corresponding to the folder or the content file positioned next higher in the hierarchy and stored at the second management information area corresponding to that folder or content file, and
wherein the index file generation unit, when a prescribed folder is deleted from the hierarchy structure,
updates the index file to correspond to the deleted prescribed folder,
detects, in the updated index file, the first management information area corresponding to the folder next higher in the hierarchy than the deleted prescribed folder and the second management information areas corresponding to the folders next lower in the hierarchy than the deleted prescribed folder based on the first index information of the deleted prescribed folder indicating the first management information area corresponding to the folder next higher in the hierarchy, and based on a second index information list of the deleted prescribed folder indicating the second management information areas corresponding to the folders next lower in the hierarchy, and
updates the second index information list in the first management information area corresponding to the folder next higher in the hierarchy than the deleted prescribed folder and the first index information in the second management information areas corresponding to the folders next lower in the hierarchy than the deleted prescribed folder to correspond to the deletion of the folder.

12. The file processing apparatus according to claim 11, wherein the update corresponding to the deletion of the prescribed folder is the update in which the first index information of the second management information areas corresponding to the folders next lower in the hierarchy than the deleted prescribed folder are updated to indicate the first management information area corresponding to the folder next higher in the hierarchy than the deleted prescribed folder.

13. The file processing apparatus according to claim 11, wherein the update corresponding to the deletion of the folder is the update relating to deletion of the second index information of the first management information area corresponding to the folder next higher in the hierarchy than the deleted prescribed folder.

14. A file processing method recording, in a recording medium, an index file which manages one or more content files recorded in the recording medium, the file processing method comprising:
an index file generation step generating the index file based on attribute information of the content files and folders including the content files; and
a recording step recording the index file generated in the index file generation step in the recording medium, and
wherein the content files and the folders form a hierarchy structure in which the folders are higher in the hierarchy than the content files; and
wherein, for each of the content files and the folders managed by the index file,
if one or more of the content files and the folders are positioned next lower in the hierarchy than that content file or folder, the index file generation step provides (i) a first management information area corresponding to that content file or folder, and (ii) second index information indicating second management information areas corresponding to the folders or the content files positioned next lower in the hierarchy, the second index information being arranged in a list format and being stored at the first management information area corresponding to that folder or content file, and
if one of the content files and the folders is positioned next higher in the hierarchy than that content file or folder, the index file generation step provides (i) the second management information area corresponding to that content file or folder, and (ii) first index information indicating the first management information area corresponding to the folder or the content file positioned next higher in the hierarchy, the first index information being stored at the second management information area corresponding to that folder or content file.

15. A processor encoded with a computer program for executing a file processing method for recording, in a recording medium, an index file which manages one or more content files recorded in the recording medium, the file processing method comprising:
an index file generation step generating the index file based on attribute information of the content files and folders including the content files; and
a recording step recording the index file generated in the index file generation step in the recording medium, and
wherein the content files and the folders form a hierarchy structure in which the folders are higher in the hierarchy than the content files; and
wherein, for each of the content files and the folders managed by the index file,
if one or more of the content files and the folders are positioned next lower in the hierarchy than that content file or folder, the index file generation step provides (i) a first management information area corresponding to that content file or folder, and (ii) second index information indicating second management information areas corresponding to the folders or the content files positioned next lower in the hierarchy, the second index information being arranged in a list format and being stored at the first management information area corresponding to that folder or content file, and if one of the content files and the folders is positioned next higher in the hierarchy than that content file or folder, the index file generation step provides (i) the second management information area corresponding to that content file or folder, and (ii) first index information indicating the first management information area corresponding to the folder or the content file positioned next higher in the hierarchy, the first index information being stored at the second management information area corresponding to that folder or content file.

16. A recording medium which is readable by a computer and which records a program for allowing a computer to execute a file processing method for recording, in a further recording medium, an index file which manages one or more content files recorded in the recording medium, said file processing method comprising:

an index file generation step generating the index file based on attribute information of the content files and folders including the content files; and a recording step recording the index file generated in the index file generation step in the further recording medium, and wherein the content files and the folders form a hierarchy structure in which the folders are higher in the hierarchy than the content files; and wherein, for each of the content files and the folders managed by the index file, if one or more of the content files and the folders are positioned next lower in the hierarchy than that content file or folder, the index file generation step provides (i) a first management information area corresponding to that content file or folder, and (ii) second index information indicating second management information areas corresponding to the folders or the content files positioned next lower in the hierarchy, the second index information being arranged in a list format and being stored at the first management information area corresponding to that folder or content file, and if one of the content files and the folders is positioned next higher in the hierarchy than that content file or folder, the index file generation step provides (i) the second management information area corresponding to that content file or folder, and (ii) first index information indicating the first management information area corresponding to the folder or the content file positioned next higher in the hierarchy, the first index information being stored at the second management information area corresponding to that folder or content file.

17. A file processing apparatus playing, from a recording medium, an index file which manages one or more content files and folders recorded in the recording medium, the apparatus comprising:

an index file playing unit playing the index file from the recording medium, and wherein the content files and the folders form a hierarchy in which the folders are higher in the hierarchy than the content files, wherein for each of the content files and the folders managed by the index file, if one or more of the content files and the folders are positioned next lower in the hierarchy than that content file or folder, (i) a first management information area corresponding to that content file or folder is provided, and (ii) second index information indicating second management information areas corresponding to the folders or the content files positioned next lower in the hierarchy is provided, the second index information being provided in a list format and stored at the first management information area corresponding to that folder or content file, and if one of the content files and the folders is positioned next higher in the hierarchy than that content file or folder, (i) the second management information area corresponding to that content file or folder is provided, and (ii) first index information indicating the first management information area corresponding to the folder or the content file positioned next higher in the hierarchy is provided, the first index information being stored at the second management information area corresponding to that folder or content file, and wherein for each of the content files and the folders managed by the index file, if the one of the content files and the folders is positioned next higher in the hierarchy than that content file or folder, the index file playing unit plays the second management information area corresponding to that content file or folder based on the second index information set at the first management information area corresponding to the next higher content file or folder, and if the one or more of the content files and the folders are positioned next lower in the hierarchy than that content file or folder, the index file playing unit plays the first management information area corresponding to that content file or folder based on the first index information set at the second management information areas corresponding to the next lower content files or folders.

18. A file processing method playing an index file from a recording medium, which manages one or more content files or folders recorded in the recording medium, the file processing method comprising:

an index file playing step playing the index file from the recording medium, and wherein the content files and the folders form a hierarchy in which the folders are higher in the hierarchy than the content files, wherein for each of the content files and the folders managed by the index file, if one or more of the content files and the folders are positioned next lower in the hierarchy than that content file or folder, (i) a first management information area corresponding to that content file or folder is provided, and (ii) second index information indicating second management information areas corresponding to the folders or the content files positioned next lower in the hierarchy is provided, the second index information being provided in a list format and stored at the first management information area corresponding to that folder or content file, and if one of the content files and the folders is positioned next higher in the hierarchy than that content file or folder, (i) the second management information area corresponding to that content file or folder is provided, and (ii) first index information indicating the first management information area corresponding to the folder or the content file positioned next higher in the hierarchy is provided, the first index information being stored at the second management information area corresponding to that folder or content file, and wherein for each of the content files and the folders managed by the index file, if the one of the content files and the folders is positioned next higher in the hierarchy than that content file or folder, the index file playing step plays the second management information area corresponding to that content file or folder based on the second index information set at the first management information area corresponding to the next higher content file or folder, and if the one or more of the content files and the folders are positioned next lower in the hierarchy than that content file or folder, the index file playing step plays the first management information area corresponding to that content file or folder based on the first index information set at the second management information areas corresponding to the next lower content files or folders.

19. A processor encoded with a computer program for executing a file processing method for playing, from a recording medium, an index file which manages one or more content files or folders recorded in the recording medium, the file processing method comprising:

an index file playing step playing the index file from the recording medium, and wherein the content files and the folders form a hierarchy in which the folders are higher in the hierarchy than the content files, wherein for each of the content files and the folders managed by the index file, if one or more of the content files and the folders are positioned next lower in the hierarchy than that content file or folder, (i) a first management information area corresponding to that content file or folder is provided, and (ii) second index information indicating second management information areas corresponding to the folders or the content files positioned next lower in the hierarchy is provided, the second index information being provided in a list format and stored at the first management information area corresponding to that folder or content file, and if one of the content files and the folders is positioned next higher in the hierarchy than that content file or folder, (i) the second management information area corresponding to that content file or folder is provided, and (ii) first index information indicating the first management information area corresponding to the folder or the content file positioned next higher in the hierarchy is provided, the first index information being stored at the second management information area corresponding to that folder or content file, and wherein for each of the content files and the folders managed by the index file, if the one of the content files and the folders is positioned next higher in the hierarchy than that content file or folder, the index file playing step plays the second management information area corresponding to that content file or folder based on the second index information set at the first management information area corresponding to the next higher content file or folder, and if the one or more of the content files and the folders are positioned next lower in the hierarchy than that content file or folder, the index file playing step plays the first management information area corresponding to that content file or folder based on the first index information set at the second management information areas corresponding to the next lower content files or folders.

20. A recording medium which is readable by a computer and which records a program for allowing a computer to execute a file processing method for playing, from a further recording medium, an index file which manages one or more content files or folders recorded in the recording medium, said file processing method comprising:

an index file playing step playing the index file from the recording medium, and wherein the content files and the folders form a hierarchy in which the folders are higher in the hierarchy than the content files, wherein for each of the content files and the folders managed by the index file, if one or more of the content files and the folders are positioned next lower in the hierarchy than that content file or folder, (i) a first management information area corresponding to that content file or folder is provided, and (ii) second index information indicating second management information areas corresponding to the folders or the content files positioned next lower in the hierarchy is provided, the second index information being provided in a list format and stored at the first management information area corresponding to that folder or content file, and if one of the content files and the folders is positioned next higher in the hierarchy than that content file or folder, (i) the second management information area corresponding to that content file or folder is provided, and (ii) first index information indicating the first management information area corresponding to the folder or the content file positioned next higher in the hierarchy is provided, the first index information being stored at the second management information area corresponding to that folder or content file, and wherein for each of the content files and the folders managed by the index file, if the one of the content files and the folders is positioned next higher in the hierarchy than that content file or folder, the index file playing step plays the second management information area corresponding to that content file or folder based on the second index information set at the first management information area corresponding to the next higher content file or folder, and if the one or more of the content files and the folders are positioned next lower in the hierarchy than that content file or folder, the index file playing step plays the first management information area corresponding to that content file or folder based on the first index information set at the second management information areas corresponding to the next lower content files or folders.

* * * * *

UNITED STATES PATENT AND TRADEMARK OFFICE
CERTIFICATE OF CORRECTION

| | | |
|---|---|---|
| PATENT NO. | : 8,417,687 B2 | Page 1 of 1 |
| APPLICATION NO. | : 11/666378 | |
| DATED | : April 9, 2013 | |
| INVENTOR(S) | : Fumitaka Kawate et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this
Fourteenth Day of May, 2013

Teresa Stanek Rea
*Acting Director of the United States Patent and Trademark Office*